US005148187A

United States Patent [19]

Ono et al.

[11] Patent Number: 5,148,187

[45] Date of Patent: Sep. 15, 1992

[54] PRINTING APPARATUS WITH MECHANISM PRECISELY DEFINING PRINTING START POSITION

[75] Inventors: Katsuhisa Ono, Sagamihara; Yasuhito Eguchi, Ebina; Mitsuyoshi Shindo, Yokohama; Hiroshi Katsuno, Yamato, all of Japan

[73] Assignee: Sony Corporation, Japan

[21] Appl. No.: 264,521

[22] Filed: Oct. 31, 1988

[30] Foreign Application Priority Data

Nov. 5, 1987 [JP] Japan ............ 62-279564
Oct. 17, 1988 [JP] Japan ............ 63-261072

[51] Int. Cl.[5] ............ G01D 15/00

[52] U.S. Cl. ............ 346/76 PH; 346/134; 400/624; 400/629; 400/625; 271/35; 271/118; 271/131; 271/165

[58] Field of Search ............ 271/165, 118, 35, 131, 271/113, 3, 4; 346/134, 136, 76 PH; 400/120, 624, 629, 625

[56] References Cited

U.S. PATENT DOCUMENTS 4,565,128 1/1986 Moriyama et al. ............ 400/144.2
4,687,356 8/1987 Matsui et al. ............ 101/93.19

FOREIGN PATENT DOCUMENTS 0064433 4/1984 Japan ............ 271/165

*Primary Examiner*—Benjamin R. Fuller
*Assistant Examiner*—Huan Tran
*Attorney, Agent, or Firm*—Ronald P. Kananen

[57] ABSTRACT

A color printer is provided in which a paper sheet is wrapped about a rotatable platen and three colors are printed on the sheet, to obtain an image, by a thermal head and a color ribbon during three rotations of the platen. In a paper feeding device for the printer, a sheet of paper is fed by a feeding roller, from the bottom of a stack of paper sheets in a paper tray through, a feeding guide to the platen. The tray has an opening in its bottom plate so as to expose the lowermost paper sheet stored therein. The feeding roller is provided under the tray and lifts up toward the opening of the tray so as to come in engagement with the lowermost paper sheet, the feeding roller rotating to feed it to the platen. The width of the platen is less than that of the sheet and the circumference thereof is less than the length of the sheet. Therefore, when the sheet is wrapped about the platen, it extends laterally outward from the ends thereof, and its ends overlap. Accordingly, during printing, the sheet is securely wrapped about the platen and its position does not shift and the extension of the sheet from the edges of the platen allows a sensor to determine a print starting position by sensing a mark of the edge of the sheet. Thus, a fixed print starting position is obtained during all three rotations of the platen during the print cycle.

12 Claims, 27 Drawing Sheets

PRINTING APPARATUS WITH MECHANISM PRECISELY DEFINING PRINTING START POSITION

BACKGROUND OF THE INVENTION

The present invention relates generally to a printing apparatus, and the invention is more particularly directed to a printer which can print color images clearly without shifting between colors.

Printing apparatuses in which a paper sheet is wrapped about a rotatable platen and a color image printed thereon by a thermal head through a ribbon are well known. An example of such a printer, shown in FIGS. 38 and 39, has a paper ejecting housing 202 and a paper feeding portion 203. The ejecting housing 202 faces toward a printing station 201 and is located at the upper side of a printer 200, while the feeding device 203 is directed to the printing station 201 and is arranged under the ejecting portion. A paper feeding roller 204 is provided above an upwardly opened box-shaped paper feeding tray 207. The feeding tray 207 has a detachable bottom plate 206 for receiving a stack of paper sheets to be printed. When a paper sheet is fed to the platen in order to be printed, as shown in FIG. 38, the bottom plate 206 is lifted up by a lifting mechanism (not shown) so that the reverse surface (i.e., a non-printed) of the top sheet of the stack of paper sheets comes in contact with the peripheral surface of the roller 204 under pressure. When the printed paper sheet is transferred to the paper ejecting housing 202, as shown in FIG. 39, the feeding roller 204 returns to the initial position.

The paper sheet fed to the printing station by the feeding roller 204 is wrapped about a rotatable platen 208 by a pinch roller 209 or so forth. While the platen 208 rotates three cycles, a color image is printed on the paper sheet by a thermal head through a ribbon. When the printing is over, a guide plate 212 comes in contact with the platen 208 so as to separate the printed paper sheet from the peripheral surface thereof. The printed paper sheet is carried out into the ejecting housing 202.

In the above described conventional type paper feeding system, since a feeding roller repeatedly comes in contact with the reverse surface of the uppermost paper sheet within the feeding tray and feeds it to the platen, the agitated contact of the printing surface of the lowermost paper sheet with the bottom of the feeding tray tends to damage it. For the purpose of avoiding damage, is is necessary to provide a protection sheet between the bottom plate and the lowermost paper sheet, this results in inconvenience and relatively high running cost.

Moreover, since new paper sheets are supplied and removed from the top of the stack of sheets within the paper feeding tray, the lowermost paper sheet tends to remain longer.

Further, during printing, the edge of paper sheet wrapped on the platen to collide with the pinch roller, the guide roller or so forth and position of the paper on the platen becomes shifted slightly each revolution which causes the printing start position of each of three colors to be shifted relative to the others.

SUMMARY OF THE INVENTION

It is accordingly one object of the present invention to provide a printing apparatus which has a paper feeding system for feeding the lowermost printing paper sheet of a stack of paper sheets within a paper feeding tray without damaging the printing surface thereof.

Another object is to provide an improved color printing apparatus which enables the print starting position to be maintained precisely without shifting between colors.

According to one aspect of the present invention, there is provided a printing apparatus for printing an image on a sheet of printing medium comprising a rotatable platen whose circumference is less than the length of the sheet by a predetermined value, first means for driving the platen about which the sheet is wrapped so that the ends of the sheet overlap each other during rotation, and second means for printing an image on the printing paper during rotation of the platen.

According to a further aspect of the invention, there is provided a printing apparatus for printing an image on a sheet of paper comprising a platen rotatable in a predetermined direction, provided at a printing station, about which the sheet is wound during a printing operation; a tray, for storing a stack of printing medium sheets, having an opening in its bottom so as to expose the reverse surface of a lowermost sheet of the stack of the printing medium sheets; and feeding means, provided under the tray, for feeding the lowermost printing sheet exposed in the opening toward the platen.

According to a further aspect of the invention there is provided a multicolor printing apparatus for printing an image on a sheet of printing medium comprising a tray, for storing a stack of the printing sheets, having an opening in its bottom from which the reverse surface of a lowermost sheet stored therein is exposed a rotatable platen, provided at a printing station, whereon the sheet is wound so that the ends of the sheet overlap each other and a side edge thereof projects beyond an end of the platen during printing; first means, for feeding the lowermost sheet exposed in the opening toward the platen, provided under the tray; second means for driving the platen by a predetermined number of rotations in each printing operation; third means for printing an image on the sheet wrapped about the platen during rotation of the platen; and fourth means, associated with the third means, for sensing the presence of the printing sheet wrapped about the platen to determine a printing start position for each revolution of the platen, provided in the vicinity of the third means.

According to another aspect of the invention, there is provided a printing apparatus for printing an image on a sheet of printing medium comprising first means on which the sheet is wound such that the ends thereof overlap, for rotating a predetermined number of revolutions in one printing operation and provided at a printing station, and second means for printing an image on the printing medium through the predetermined revolutions of the first means.

BRIEF DESCRIPTION OF THE DRAWINGS

The present invention will be understood from the detailed description given hereinbelow and from the accompanying drawings of the preferred embodiment with is given explanation and understanding only and is not intended to imply limitations to the invention.

DESCRIPTION OF THE PREFERRED EMBODIMENT

In order to facilitate a better understanding the present invention, a whole printing system of a polychromatic printing apparatus according to the present invention will now be described hereinbelow.

Figure 1:
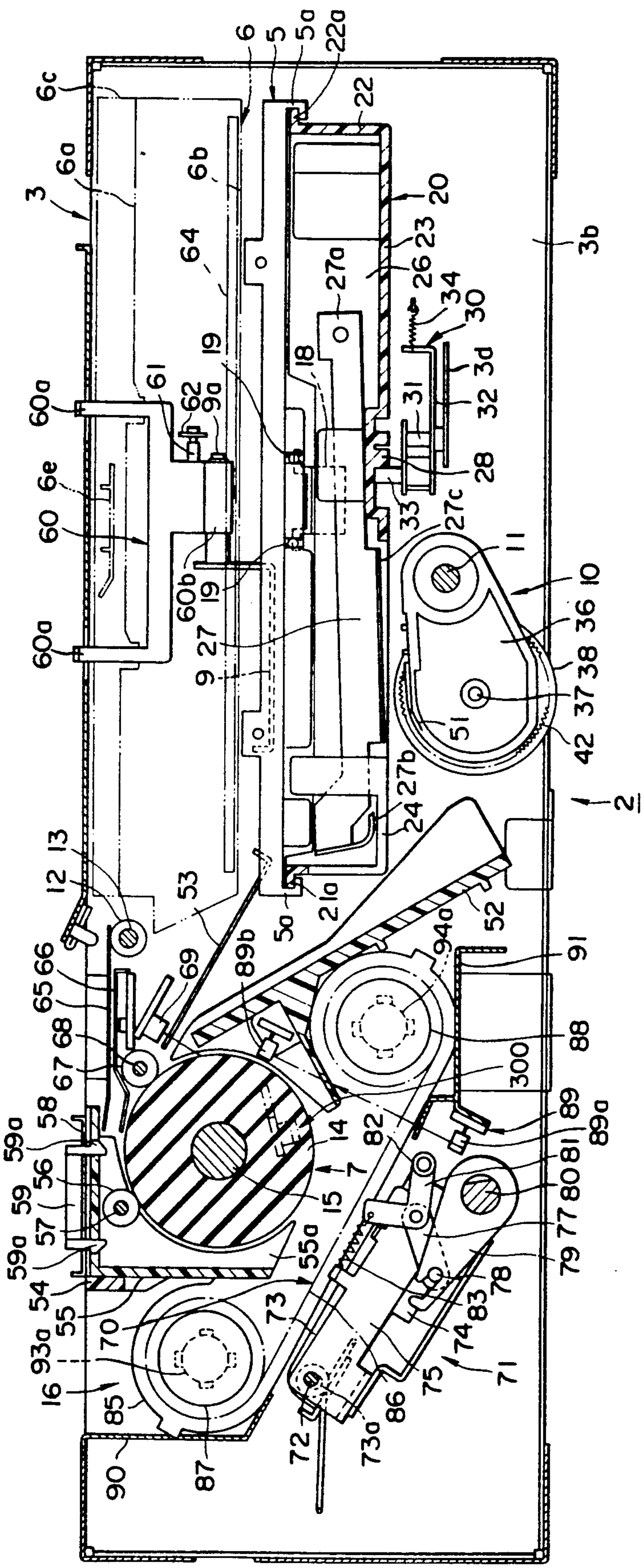
FIG. 1 is a longitudinal sectional view of a printing apparatus of the present invention.
Figure 2:
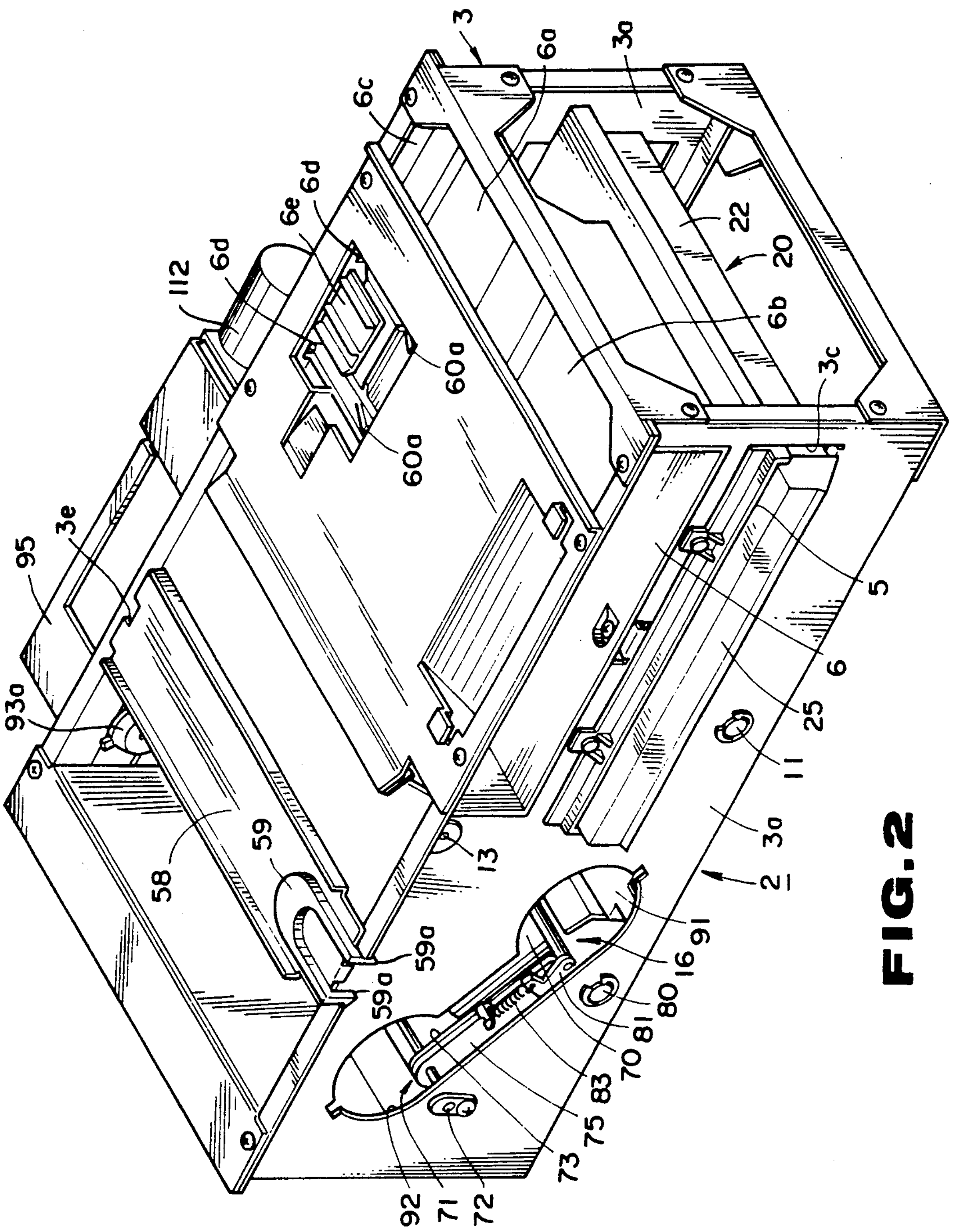
FIG. 2 is a perspective exploded view of a color printing apparatus of the present invention.
Figure 17:
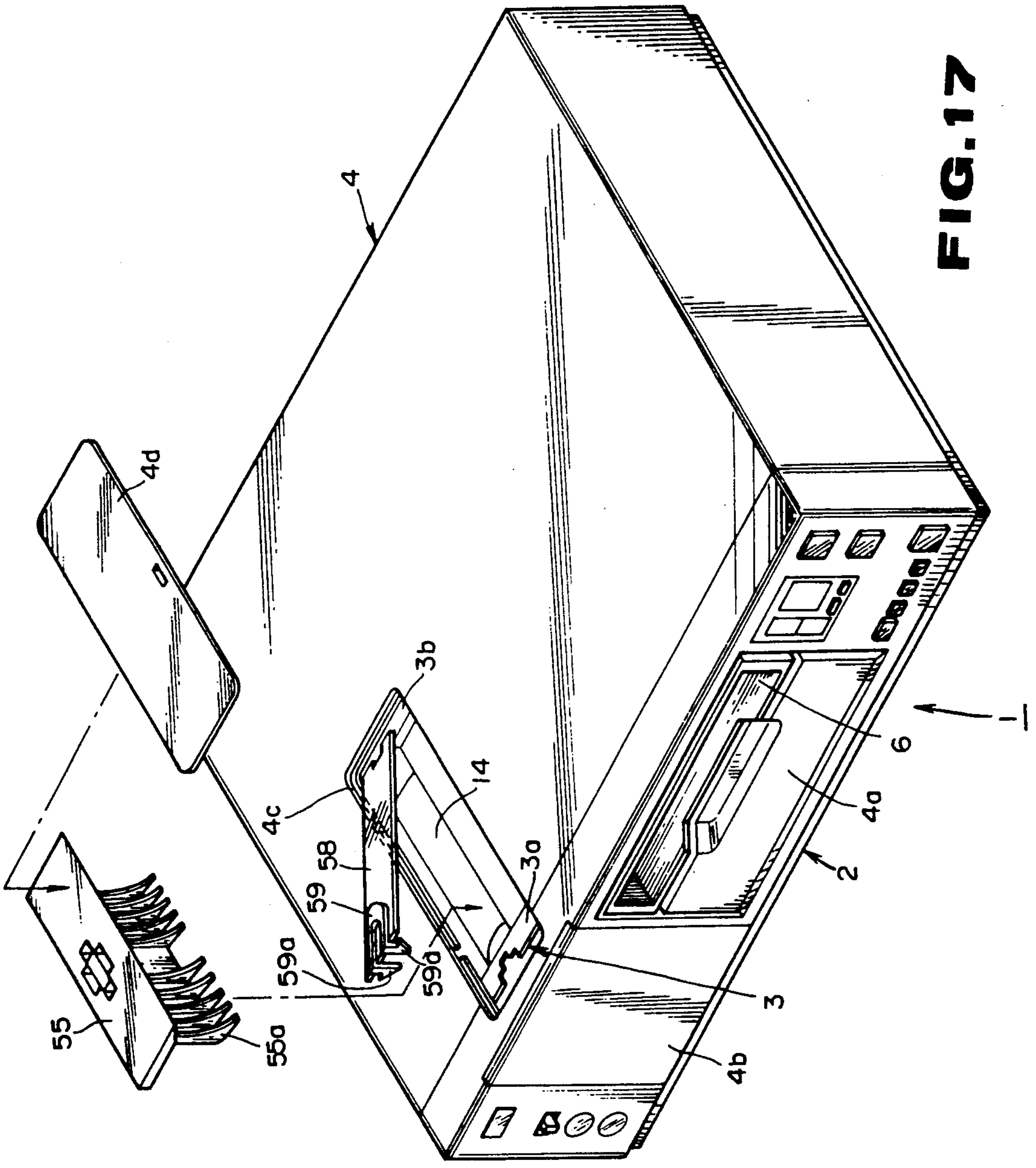
FIG. 17 is a perspective view of a color printing apparatus of the present invention.

Referring now to the drawings, particularly to FIGS. 1, 2 and 17, there is illustrated a printing apparatus according to the present invention. A polychromatic printing apparatus 1 has a printer cabinet 2. The cabinet 2 comprises a rectangular frame type inner chassis 3 and an outer chassis 4 covering the front chassis. The cabinet 2 has a tray holder 5 for receiving a feeding tray and a receiving tray housing 6 at the front side thereof. The tray holder 5 and the receiving tray housing 6 are arranged on the right-hand side, in FIG. 2, of the cabinet 2 and the housing 6 is provided above the holder 5. A printing station 7 is provided so as to face the tray holder 5 and the tray housings 6 in the left-hand side of FIG. 2.

A feeding device 10 for feeding printing paper sheets 8 one by one to the printing station 7 is interposed between a front plate **3*a* and a rear plate 3*b* of the inner chassis 3. The device 10 is pivotally supported by a driving shaft 11 below the feeding tray holder 5. An ejecting roller shaft 13 has a plurality of ejecting rollers 12 for carrying the printing paper sheet 8 towards the receiving tray housing 6. The shaft 13 is rotatably supported between the front plate 3*a* and the rear plate 3*b* and is disposed between the printing station 7 and the receiving tray housing 6. A platen shaft 15 having a platen 14 is disposed above the printing station 7 and is rotatably supported between the front plate 3*a* and the rear plate 3*b*. A ribbon cartridge housing 16 for storing a ribbon cartridge is defined by the printing station 7**.

As shown in FIG. 17, the receiving housing 6 opens forwardly from the upper right side in front of the outer chassis 4 of the cabinet 2. The tray holder 5 is covered by an openable lid **4*a*. The ribbon cartridge 16, similarly to the tray holder 5, is covered by an openable lid 4*b***.

Figure 5:
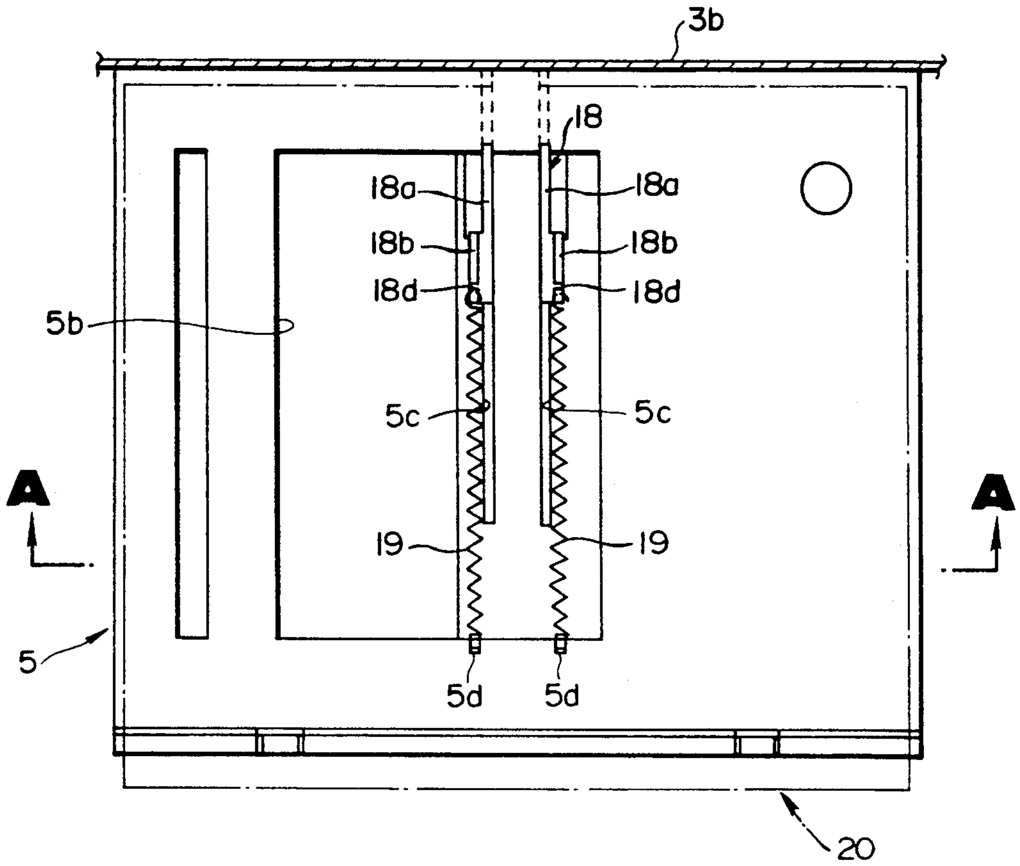
FIG. 5 is a top view of a paper feeding tray holder.
Figure 6:
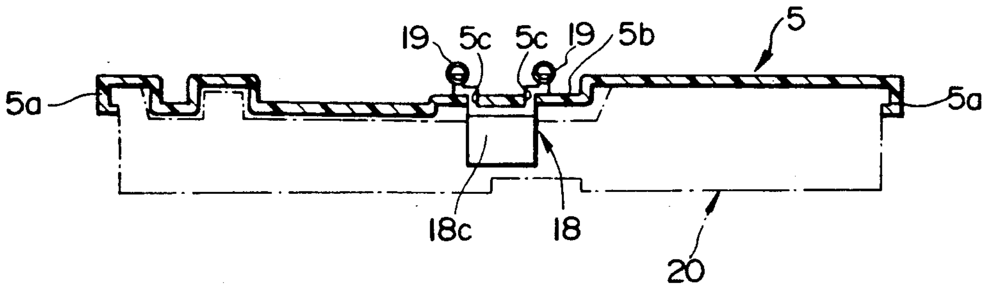
FIG. 6 is a section view taken along the line A—A indicated in FIG. 5.

With reference to FIGS. 2, 5, and 6, a feeding system will be described hereinbelow.

The rectangularly shaped tray holder 5 is made of a synthetic resin. The tray holder 5 is disposed between the front plate **3*a* and the rear plate 3*b* of the inner chassis 3 and is fixed by clamps at the upper end of an opening portion 3*c* which is formed at a right middle side of the front plate. Hook portions 5*a* are integrally formed with the tray holder 5 at each side thereof. The hook portions 5*a* extend downwardly and the ends thereof oppose each other for detachably receiving a feeding tray 20**, to be described hereinafter.

Figure 8:
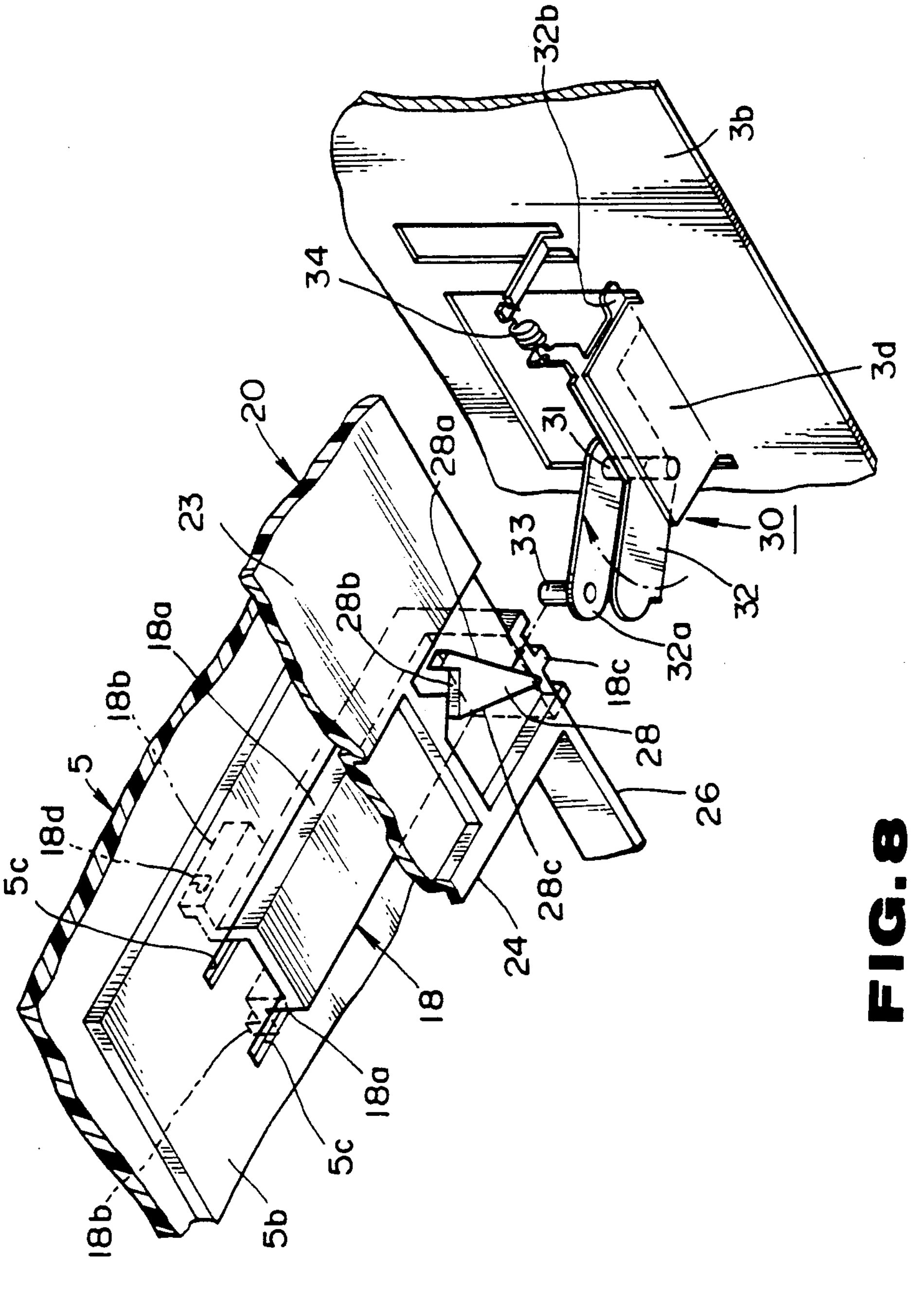
FIG. 8 is a partial perspective breakaway view of a locking mechanism for a paper feeding tray indicated in FIG. 7.

A rectangular recess portion **5*b* is formed at the middle portion of the tray holder 5. A pair of parallel elongated guiding openings 5*c* which extend in the longitudinal direction, or in the direction perpendicular to the rear plate 3***b* of the inner chassis 3 is provided in the recess portion 5*b*. An ejecting member 18, as shown in FIG. 8, which is made of a synthetic resin, is arranged at the underside of the recess portion 5*b* so as to slide in the pair of openings 5*c*. This member 18 is operable to unload the feeding tray 20 to project partly from the cabinet 2 towards the outside thereof. The member 18 has an essentially U-shaped cross section. Both side walls 18*a* of the member 18 1- extend upwardly and are received in the pair of elongated openings 5*c*. A pair of L-shaped portions 18*b* project laterally at the upperside of the holder 5 so as to slidably retain the ejecting member 18 on the holder 5. The pusher portion 18*c* which comes in contact with the end of the feeding tray 20 extends downwardly from the end of the ejecting member 18. It will be appreciated that the ejecting member 18 can reciprocate slidably along the pair of elongated openings 5*c*.

L-shaped cut out portions 18*d* are formed in the portion 18*b* of the ejecting member 18. A pair of holes 5*d* are provided in which the ends of a pair of tension springs are installed to urge the ejecting member 18 away from the rear plate 3*b*.

Figure 7:
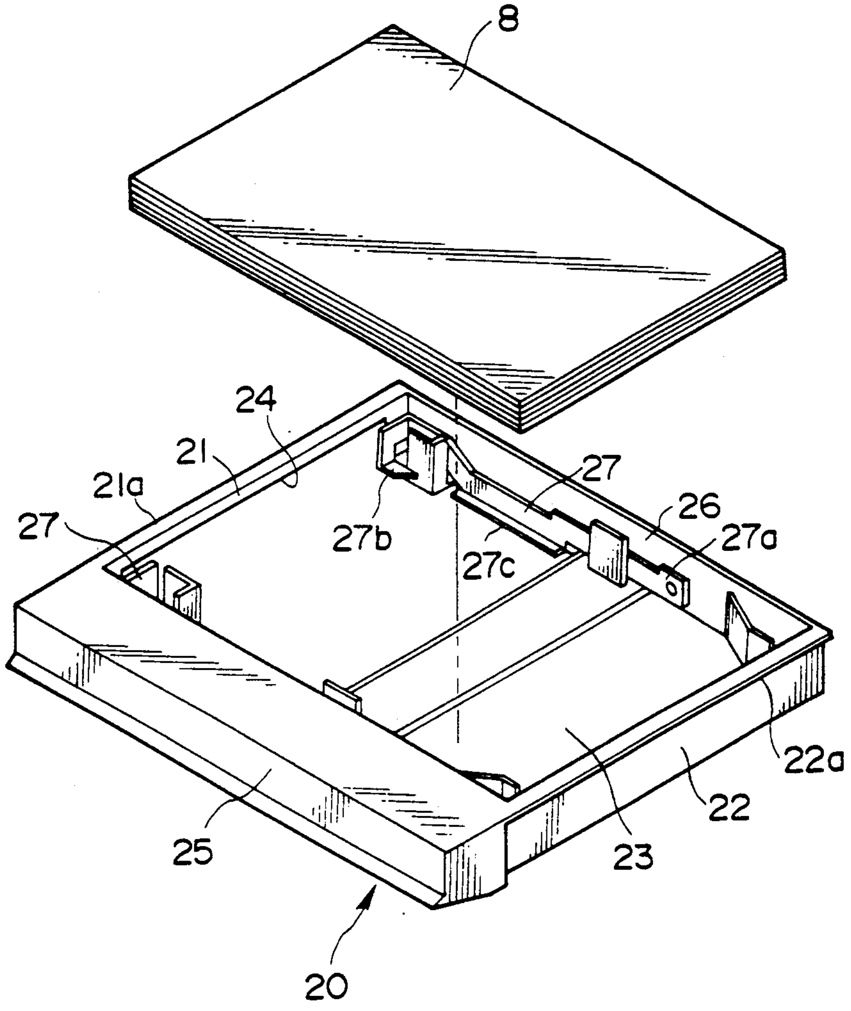
FIG. 7 is a perspective view of a paper feeding tray.

With reference to FIG. 7, the feeding tray and a locking mechanism therefor will be described hereinbelow.

The feeding tray 20 is made of a synthetic resin and is generally in the form of an upwardly opening box for receiving a stack of paper sheets 8. In a bottom of the tray 20, an opening 24 which is half the size of the tray bottom is provided so as to expose a half of the back surface, or the reverse side of the paper of the lowermost sheet of a stack of paper sheets 8. Flange portions 21*a* and 22*a* are provided on side walls 21 and 22 respectively so as to allow the feeding tray 20 to be slidably supported by holder portions 5*a* (see FIG. 6).

A handle 25 is formed in the front of the tray 20. A pair of feeding levers 27 are provided which supply the lowermost paper sheet 8 of the stack of paper sheets within the tray 20 to the printing station 7. Each end of the levers 27 is pivotally supported by a pin, one of which is connected to the inner side of the handle 25 and other of which is connected to the rear wall 26. The lever 27 has a barb section 27*b* for receiving a corner of a paper sheet on a corner of the opening 24 of the tray 20.

An engaging member 28 is provided so as to project downwardly from the bottom 23 of the tray 20 at the side of the rear wall 26 (see FIG. 8). The engaging member 28 is in the form of a triangle member defined by a surface 28*a* angled approximately forty-five degrees relative to the rear plate 26, a V-shaped cut-out surface 28*b*, and a tapered surface 28*c*. A locking mechanism 30 is provided at the rear plate 3*b* of the inner chassis 3. The mechanism 30 is engageable with the engaging member 28 of the feeding tray 20 to fix the feeding tray 20 within the tray holder 5 and also can release the engagement therebetween.

Figure 20:
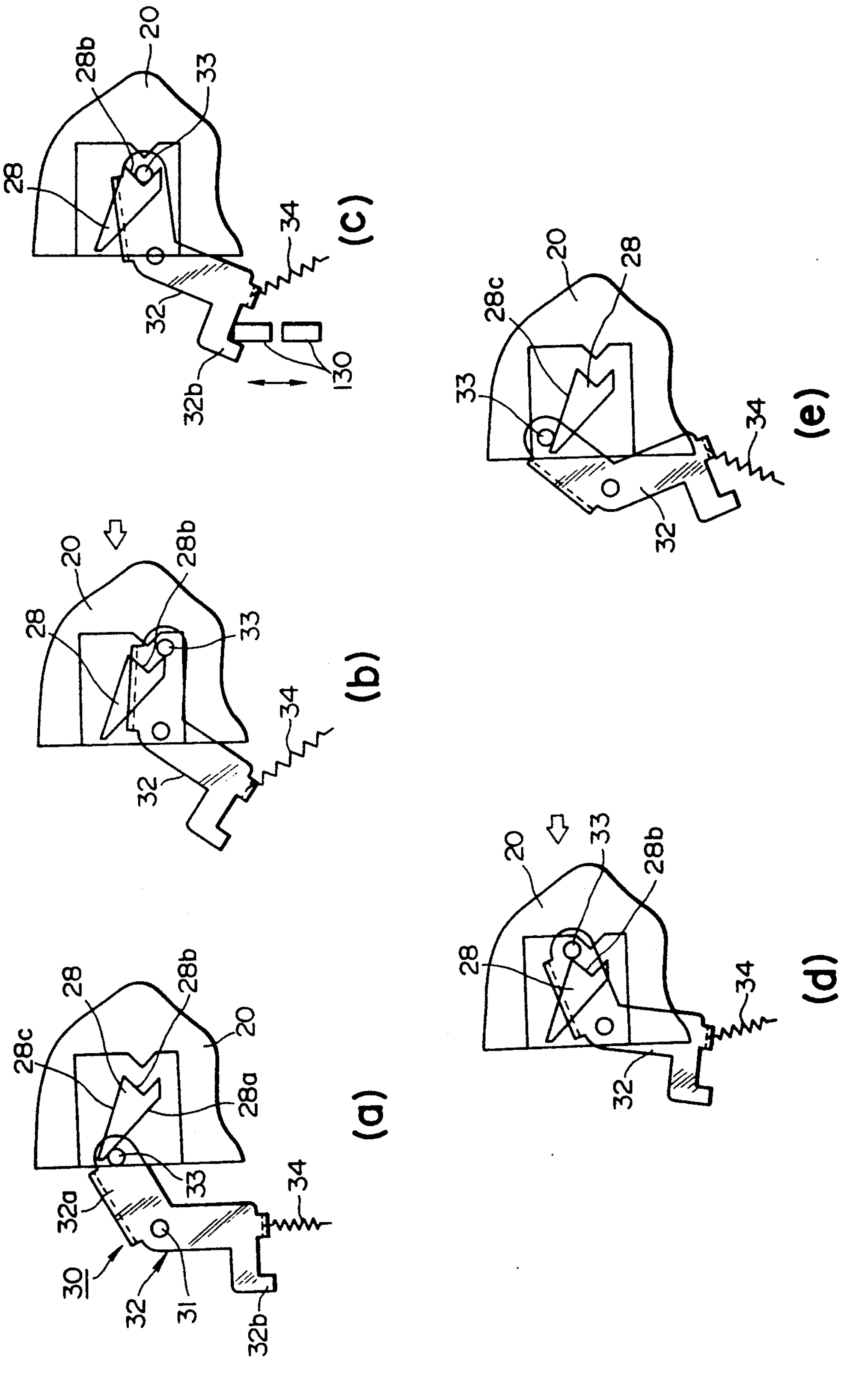
FIG. 20 is an explanatory view showing a locking and releasing method for locking and releasing a paper feeding tray.
Figure 21:
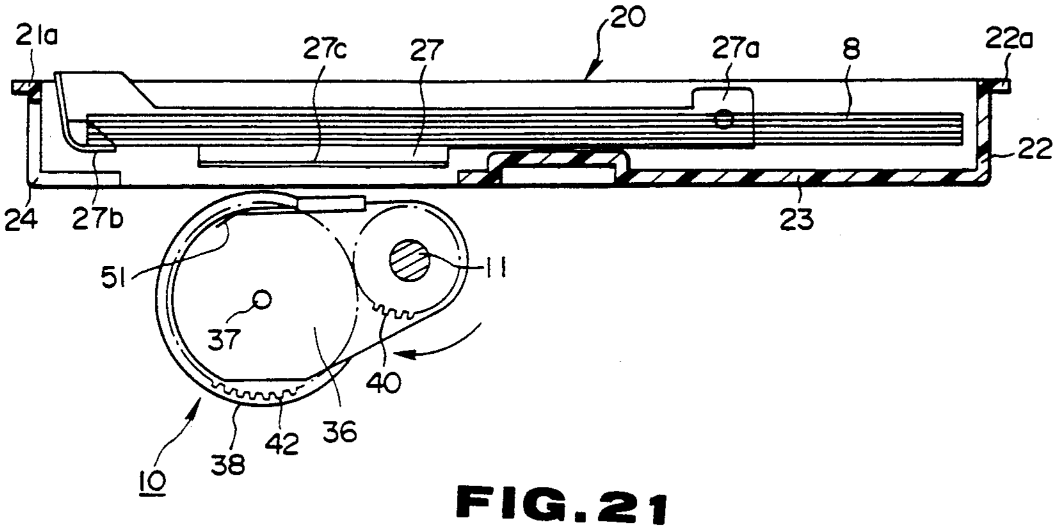
FIGS. 21 and 22 is an explanatory view showing a paper feeding mechanism.

The locking mechanism 30, as shown in FIG. 8, comprises a V-shaped locking member 32, a locking pin 33 which is secured on the end of the locking member at the feeding tray side, and a tension coil spring 34 which is hung on the other end of the locking member 32 and the rear plate 3*b*. The locking member 32 is pivotally supported by an axle 31 on the tab 3*d* which is formed with a section of the rear plate folded so as to project horizontally. The spring 34 urges the locking member 32 such that a hooking portion 32*b* is urged toward the rear plate 3*b*. With this arrangement, the insertion of the feeding tray 20 into the tray holder 5 causes the surface 28*a* of the engaging member 28 to come in contact with the locking pin 33 so as to rotate the locking member 32 in the direction indicated by the arrow in FIG. 8 against the tensioning force of the spring 34, as can be seen in FIGS. 20(*a*) to 20(*c*), and thereby allow the engagement of the locking pin 33 with the V-shaped surface 28D of the engaging member 28 to lock the tray. By pushing the handle backward, the engagement between the locking pin 33 and the engaging member 28 is released, as can be seen in FIG. 20(*d*) and 20(*e*). The feeding tray 20 is partially ejected via ejecting member 18 to project partly forward from the tray housing 6.

Figure 9:
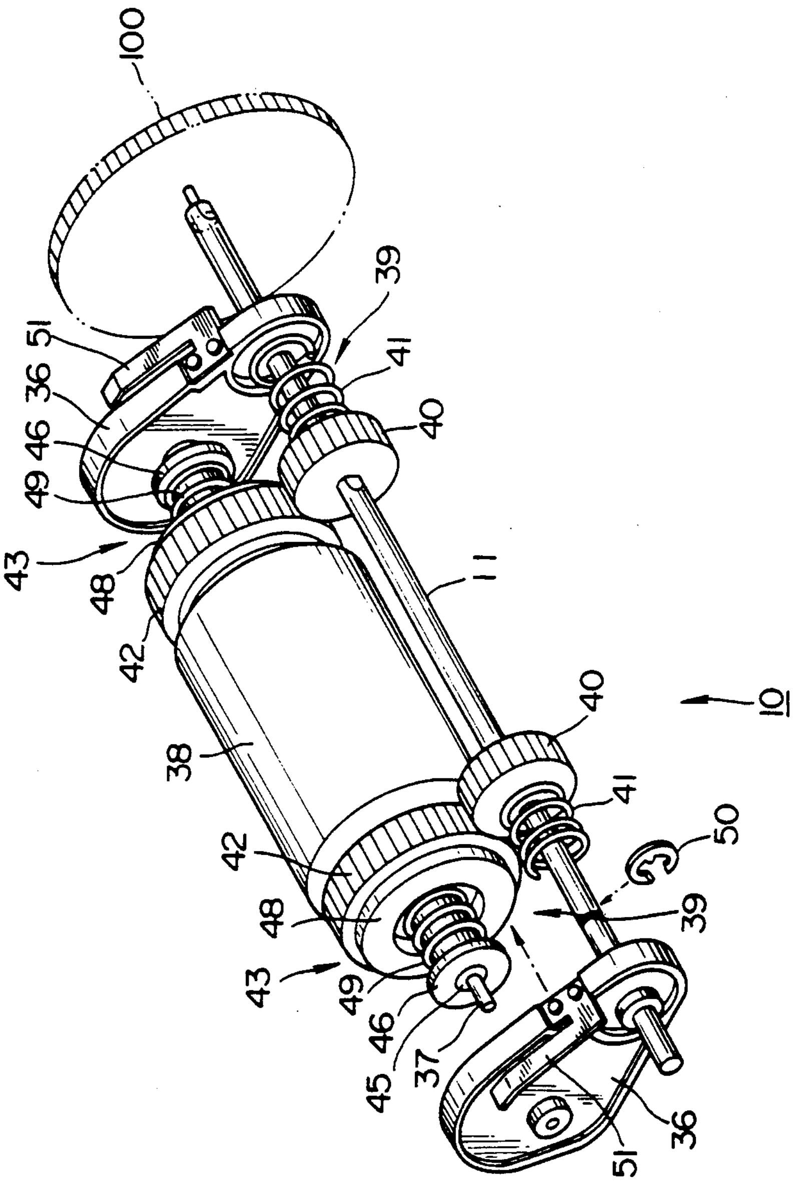
FIG. 9 is a perspective view of a paper feeding mechanism.
Figure 10:
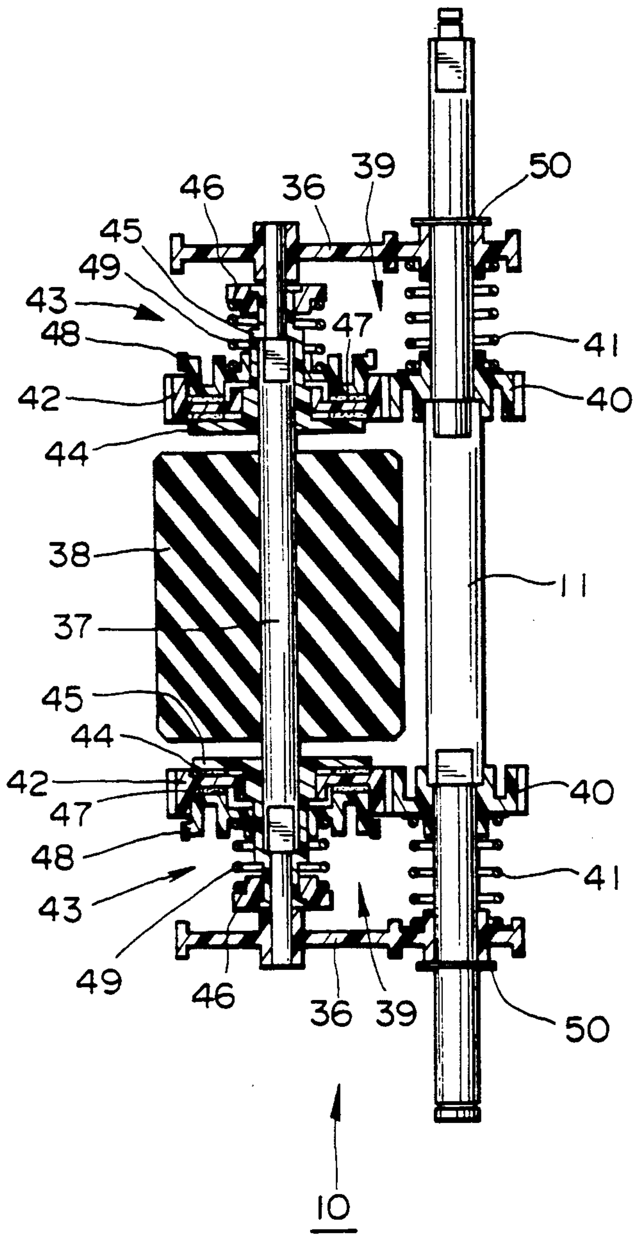
FIG. 10 is a sectional view of a paper feeding mechanism of FIG. 9.

With reference to FIGS. 9 and 10, a paper feeding system will be described hereinbelow.

A paper feeding mechanism comprises the driving shaft 11, a supporting shaft 37 which is pivotally supported on the shaft 11 by a pair of arm members 36, a rubber feeding roller 38 provided on the shaft 37, and a pair of torque limiters 39 disposed between the shafts 11 and 37 at the ends of the feeding roller for feeding the lowermost sheet 8 of the stack of paper sheets within the feeding tray 20 toward the printing station 7. The drive shaft 11 is rotatably mounted between the front plate 3*a* and the rear plate 3*b* of the inner chassis 3. The rotation of the shaft 11 causes the feeding roller 38 to rotate via a driving gear 40 and a driven gear 42, thereby feeding a paper sheet to the printing station 7. A pair of retaining rings 50 is installed in grooves provided in the shaft 11 so as to prevent the arm member 36 from moving outward due to the force of the compression spring of the limiter.

The torque limiter 39 for controlling the torque outputted by the driving shaft 11 comprises a first limiter 41 and a second limiter 43. The first limiter 41 is provided with a compression spring which is interposed between the arm member 36 and the driving gear 40 fixed on the shaft 11 and always urges the arm member outwardly against the retaining ring 50 to restrict the rotation of the arm member around the shaft 11. It will be appreciated that the arm member 36 can be rotated by the driving shaft 11 within the predetermined range of torque defined by the compression force of the spring. The second limiter 43 comprises a limiter shaft 45, a spring stopper 46, an engaging ring 48, and a compression spring 49. The second limiter 43 is arranged between the arm member 36 and a gear 42 which engages with the driving gear 40. The shaft 45 is fixed on the shaft 37 and supports the gear 42 via a felt ring 47 therebetween. The spring stopper 46 is rotatably mounted on the end of the shaft 45. The engaging ring 48 engages the felt ring 47 placed on the gear 42 and is rotatably supported on the limiter shaft 45. The compression spring is interposed between the spring stopper 46 and the engaging ring 48 and urges the engaging ring 48 into engagement with the gear 42 via the felt ring 47.

It will be appreciated that torque is outputted from the driving shaft 11 through the first limiter 41, comprised of the spring so that the pair of arm members lifts up the feeding roller 38 so as to engage the bottom sheet of the stack of paper sheets within the feeding tray 20. The second limiter 43 supplies torque to the feeding roller so that the roller separates one sheet from the bottom of the stack of paper sheets so as to feed it to the printing station 7. A pair of leaf springs 51 which contact the bottom edges 27*c* of the pair of levers 27 is mounted on the the pair of arm members. Spring force of the leaf spring 51 causes the barbed sections 27*b* of the pair of feeding levers 27 to come in contact with the paper sheet 8 with a predetermined pressure.

As shown in FIG. 1, synthetic resin middle guiding plate 52 for paper is disposed between the platen 14 and the feeding roller 38. The guiding plate 52 guides the paper sheet withdrawn within the tray 20 toward the upper peripheral surface of the platen 14. In addition, a metal upper guiding plate 53 is disposed between the tray holder 5 and the platen 14 above the guiding plate 52.

A synthetic resin frame 54 defining an opening is installed in the inner chassis 3 above the platen 14. A synthetic resin paper guiding plate 55 mounted detachably on the frame 52 so as to cover a peripheral surface of the platen 14 from the upper side of the platen. The guiding plate 55 has a plurality of ribs 55*a*. Each rib 55*a* has a section which is curved so as to correspond to the outer peripheral surface of the platen 14. A pinch roller 56 which comes in contact with the outer surface of the platen 14 is rotatably supported by a shaft 57 at the middle portion between the plurality of ribs 55*a*.

A metal lid 58 is engageble with upper edges of the front plate 3*a* and the rear plate 3*b* of the inner chassis 3 to cover the upper side of the guiding plate 55. The end of the lid 58 can be inserted into a pair of holes 3*e* provided in the rear plate 3*b*, while the other end thereof is fixed by a U-shaped synthetic resin fastener 59. The fastener 59 has a pair of barbed sections 59*a* on its legs. The engagement of the barbed sections 59*a* with the upper edge of the front plate 3*a* serves to fix the lid 58 to the cabinet 2.

As shown in FIG. 17, a rectangular opening 4*c* is formed in a position on the outer chassis 4 beneath the lid 58. The opening 4*c* is accessible by opening a lid 4*d*.

The paper ejecting system and the paper receiving tray will be described hereinbelow.

As shown in FIGS. 1 and 2, the receiving housing 6 takes the form of a rectangular synthetic resin box which has openings in the front and upper side respectively. The housing 6 is provided at of the printer upper right side between the front and the rear plates 3*a* and 3*b* of the inner chassis 3. The bottom of the housing comprises an upper step 6*a* and a lower step 6*b*. The step 6*a* is located at the rear plate 3*b* side and defines "a first ejecting position", while the step 6*b* is positioned below the step 6*a* at the front plate 3*a* side and defines "a second ejecting position".

A pair parallel of elongated openings 6*d* is formed in the middle portion of the step 6*a* of the receiving tray housing 6. The openings 6*d* extend to the upper end of a rear wall 6*c* extending upwardly from the rear end of the step 6*a*. A pair paper pushers 60*a* for pushing the printed paper sheet up is formed on the end of a U-shaped arm 60. The arm 60 can swing the paper pushers from rear to front. The base portion 60*b* of the arm 60 is rotatably supported by a pin 9 installed on an L-shaped mounting plate 9 arranged between the front plate 3*a* and the rear plate 3*b*. A pin 61 is anchored in the base portion 60*b* so as to extend in the horizontal direction. The arm 60 can therefore rotate about the pin 9*a* of the mounting plate with the result that the pair of paper pushers 60*a* projects upwardly above the bottom plate 6*a*. Moreover, a guiding flange 6*e* for guiding ejected paper sheets 8 onto the step 6*a* of the first ejecting position extends laterally from the rear wall 6*c*. The laterally projected pin 61 cooperates with an actuating plate 125 to be described hereinafter via a sliding plate 62 and a plate 63 rotatable about a pin 200 anchored in the actuating plate (see FIG. 3). Lateral displacement of the actuating plate 125 along with the surface of the rear plate 3*b* causes the sliding plate 62 to move perpendicularly to the surface of the rear plate 3*b*, thereby allowing the arm 60 to swing about the pin 9*a*, which causes the pair of paper pushers to eject the paper from the ejecting roller into the tray 64.

The receiving tray 64 is, as shown in FIG. 1, stored on the lower step 6*b* within the receiving tray housing 6. A pair of rectangular paper guiding plates 65 and 66 for guiding the printed paper sheet to the receiving tray housing 6 is disposed along the peripheral surface of the platen 14 above the guiding plate 52. Both ends of the pair of the plates 65 and 66 are fixed on the edges of the front and the rear plate 3*a* and 3*b*. Under the lower side guiding plate 66, a pinch roller 67 which contacts the peripheral surface of the platen 14 is rotatably supported by a shaft 68. A paper edge optical reflex-type sensor 69 is disposed between the paper guiding plate 66 and the guiding plate 53 at the platen 14 side. The sensor 69 senses an edge of the paper sheet 8 to be printed. In addition, a sensor 300, to be described hereafter, similar to the sensor 69 is installed at a position in the vicinity of the end surface of the platen 14 and is directed to the ribbon. The sensor 300 detects the edge of the paper sheet wrapped on the platen 14 as to whether it is in an initial position.

A head moving mechanism will be described hereinbelow.

As can be seen in FIG. 1, a head moving mechanism 71 is provided under the platen 14 of the printing station. The mechanism 71 is adapted for moving a flat-type thermal head (a printing head) 70 into contact with the periphery of the platen or to be released therefrom.

Figure 11:
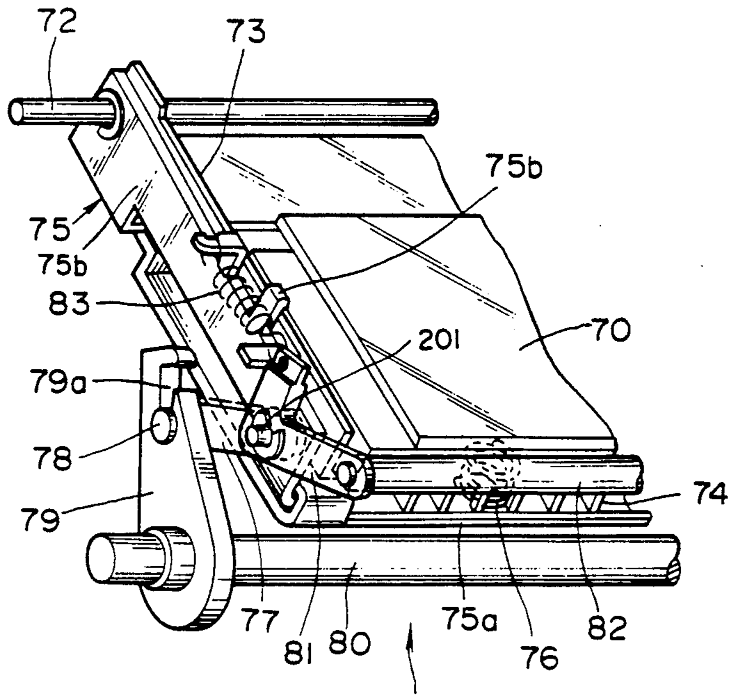
FIG. 11 is a perspective view of a head moving mechanism for lifting a thermal head up toward a platen.
Figure 12:
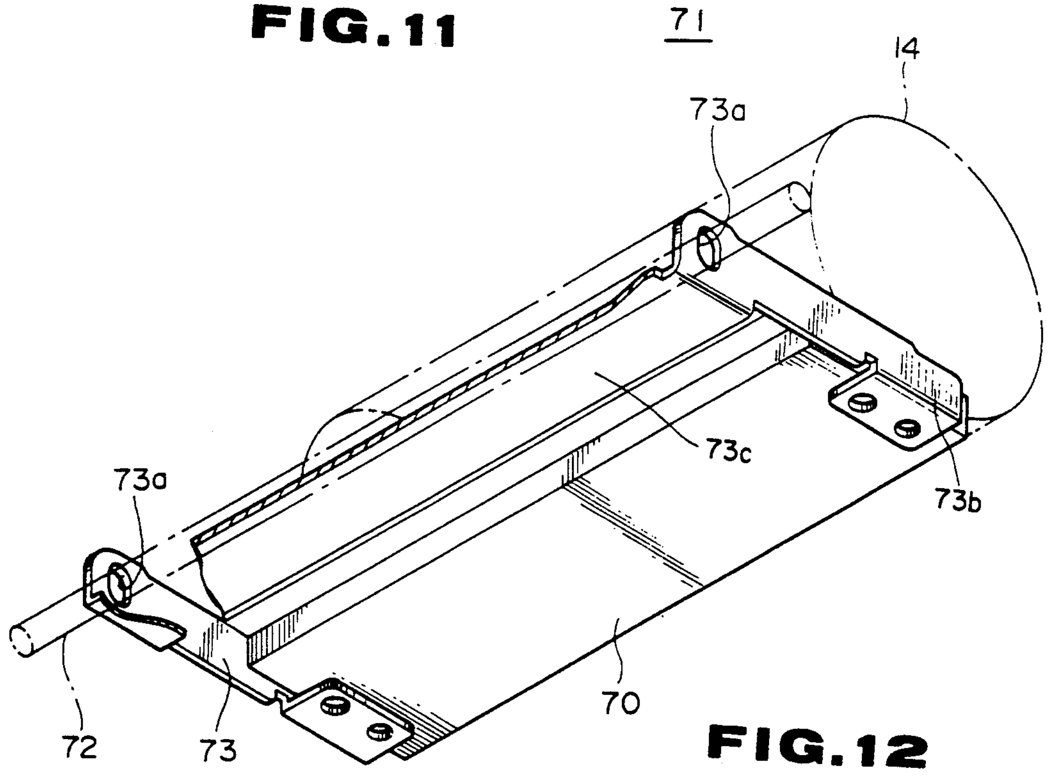
FIG. 12 is a perspective view showing a portion of a head moving mechanism of FIG. 11.
Figure 13:
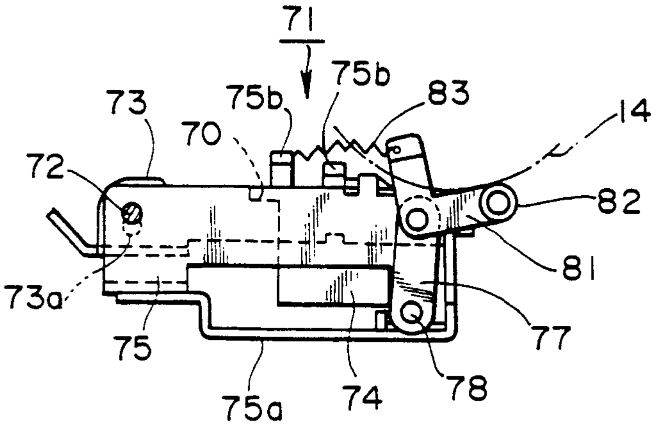
FIG. 13 is a partial side view of a head moving mechanism of FIG. 11.
Figure 14:
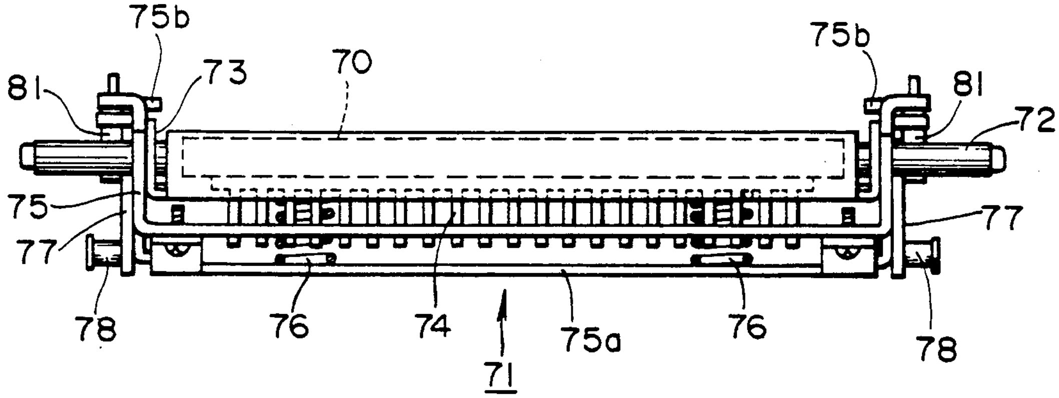
FIG. 14 is a rear view of the mechanism shown in FIG. 13.

With reference to FIGS. 11, 12, and 14, the head moving mechanism 71 comprises a head supporting member 73, a sub-head supporting member 75, a pair of linkage plates 77, a pair of driving arms 79, a driving shaft 80, and a ribbon roller 82. The head supporting member 73 is movably supported by a shaft 72 disposed between the front and the rear plates 3*a* and 3*b* of the inner chassis 3 and is adapted for fixing the thermal head 70. The sub-head supporting member 75 includes a pair of side wall portions 75*b* and a pair of elongated bottom plates 75*a* connected between the side wall portions and is in the form of rectangular frame. The ends of each of the side wall portions 75i b are pivotally supported by the shaft 72 and the head supporting members 73 are disposed between the pair of side wall portions. A pair of coil springs 76 (only one is shown) are interposed between the bottom plate 75*a* positioned at the driving shaft side and the heat sink plate on which the radiating fins 74 are formed. One end portion of pair of linkage plates 77 is rotatably connected to the side wall portions 75*b* of the supporting member 75 by a pin 201, while other portion thereof engages a cut-out portion 79*a* formed in the driving arm 79 via a pin 78. Also, an L-shaped sub-arm 81 is installed on the pin 201 at its corner and has a ribbon roller 82 at its end. The driving arm 79 is fixed on the driving shaft 80 which is rotatably supported between the rear and the front plate 3*a* and 3*b* of the inner chassis 3 and is rotatable according to the rotation of the driving shaft. It will be appreciated that with this arrangement, the rotation of the driving arm 79 about the driving shaft causes the head supporting member 73 and the sub-head supporting member 75 with the thermal head 70 to be lifted up toward the platen 14.

With reference to FIG. 12, the head supporting member 73, as described above, generally defines a U-shaped member. A pair of side plates 73b has through holes 73a for receiving the shaft 72. The holes 73a are elongated vertically relative to a bottom plate 73c so as to allow the head supporting member 73 to move a little within the opening. Therefore, when the thermal head 70 is driven contact with the platen 14 by the compression force exerted by the spring 76, so the play allows the contact pressure of the surface of the head with the peripheral surface of the platen to be equal along the entire length. The engaging pressure of the thermal head 70 is supplied by the pair of coil springs 76 when the head supporting member 73 is thrust toward the platen 14 by the driving arm 79.

When the thermal head 70 is not in contact with the platen 14, the location of the head is determined by a barbed portion 75b provided on the sub-head supporting member 75 against which the head is thrust by the thrusting force exerted by the springs 76.

The ribbon roller pressure of the ribbon roller 82 for thrusting the roller against the platen 14 is provided independently from the head pressure by a tension spring 83 hung between the sub-head supporting member 75 and the sub-arm 81.

A ribbon cartridge housing will be described hereinbelow.

As can be seen in FIG. 1, the ribbon cartridge housing 16 is adapted for storing a ribbon cartridge 85. The ribbon cartridge 85 includes a supply reel 87 and a take-up reel 88. The supply reel 87 is provided with a ribbon 86 having continuous printing areas formed with yellow (Y), magenta (M), and cyanogen (C). The take-up reel 88 is rotatably mounted within the cartridge so as to take up the ribbon withdrawn from the supply reel. The leader of the Y color section of the ribbon 86 is detected by a light transmission type optical sensor 89, which comprises a light emitting element and a light receiving element.

Figure 15:
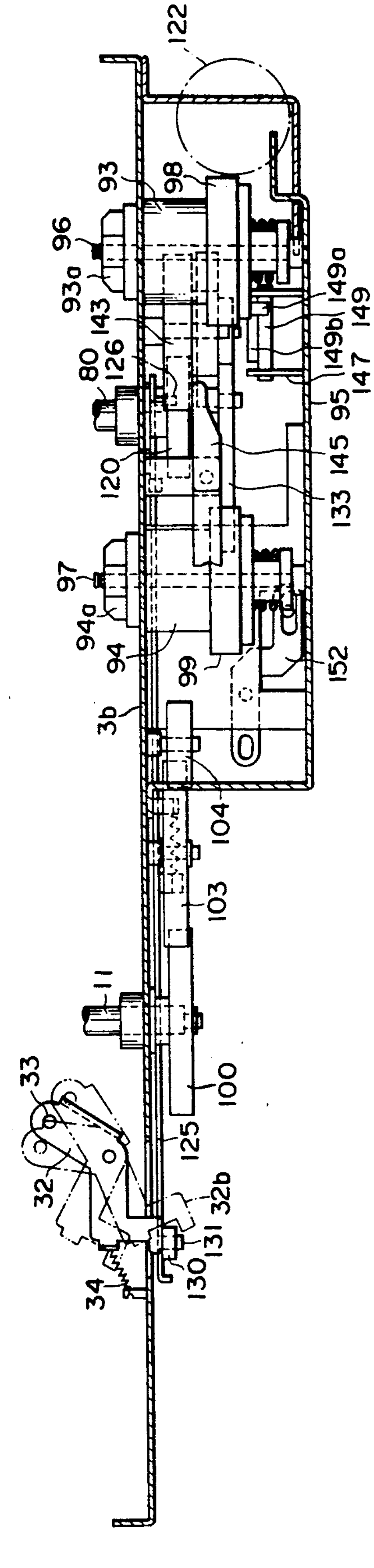
FIG. 15 is a top view of a ribbon cartridge driving system.

The ribbon cartridge housing 16 includes an upper holding plate 90 and a lower holding plate 91. The holding plate 90 is arranged within the housing 16 so as to hold the supply reel side 87 of the cartridge. The holding plate 91 is adapted for holding the take-up reel side 88. An opening for inserting the ribbon cartridge 85 into the housing 16 is, as shown in FIG. 2, formed in the front plate 3a. As shown in FIG. 15, a supply reel table 93 for the supply reel 87 and a take-up reel table 94 for the take-up reel 88 are arranged diagonally on the rear plate 3b. The reel tables 93 and 94 project inwardly from the rear plate 3b and are rotatably supported by shafts 96 and 97 respectively fixed on the mounting plate 95 which is in the form of a substantially L-shaped plate. Limiting gears 98 and 99 are disposed between the mounting plate 95 and the rear plate 3b. In addition, reel hubs 93a and 94a for engaging with the supply reel 87 and the take-up reel 88 are provided on the shafts 96 and 97.

The driving system will be described hereinbelow.

Figure 16:
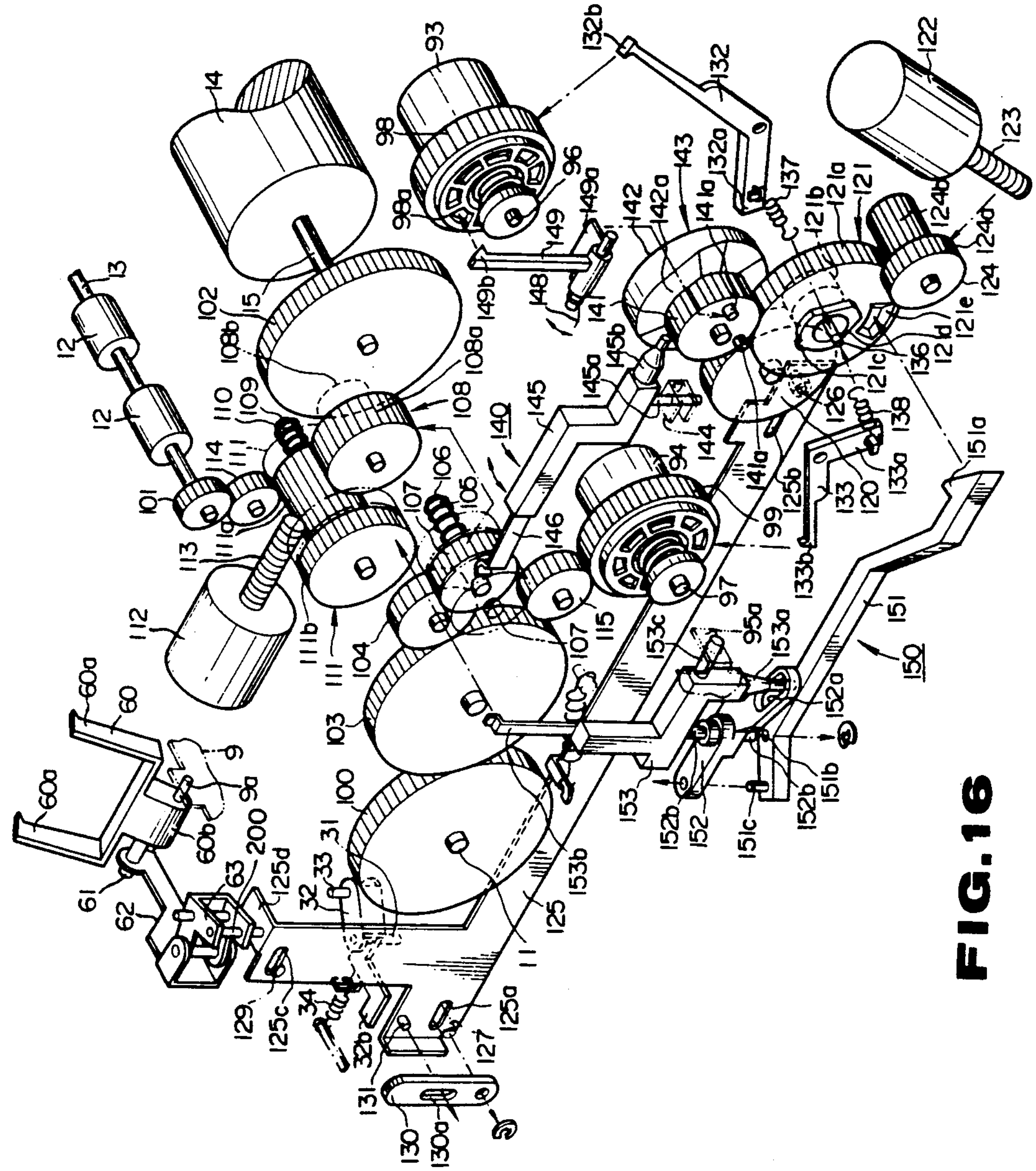
FIG. 16 is exploded perspective view of a driving system of a color printing apparatus

Referring to FIGS. 1 and 16, a paper feeding driving gear 100 and a paper ejecting roller driving gear 101, and a platen driving gear 102 are disposed at the outside of the rear plate 3b. The gear 100 is installed on the end of the driving shaft 11. The gear 101 is installed on the end of the shaft 13 on which a plurality of ejecting rollers 12 are supported. The platen driving gear 102 is installed on the shaft 15 on which the platen 14 is supported.

The paper feeding driving gear 100 engages with an intermediate pinion 104 through an intermediate gear 103. A first shifting gear 107 is urged toward the outside by a compression spring 106. The inwardly shifting (rear plate side) of the gear 107 which is carried out by a driving force changing mechanism 140 against the force due to compression of the spring causes the pinion 104 and the shifting gear 107 to be engaged with each other. The first shifting gear 107 is adapted for being shifted among three positions (outside, middle, and innerside) by the changing mechanism 140 and engages with a gear 108a of an intermediate gear assembly 108 which comprises the gear 108a and a pinion 108b.

The gear 108a of the intermediate gear assembly 108 engages with a small gear 111a of a second shifting gear assembly 111. The second shifting gear assembly 111 comprises a gear 111 engageble with a worm 113 and the small gear 111a and is urged toward the outside on a shaft 109 due to a spring force of a compression spring 110 via a second driving force changing mechanism 150. Inward movement (rear plate 3b side) of the second gear assembly 111 by the second changing mechanism 150 causes the gear 111b to engage with the worm 113 connected to a stepping pulse motor 112 provided as a second driving source. The gear 111a of the second gear assembly 111 engages with a driving gear 101 for the ejecting roller 12 via a pinion 114.

The outward shifting of the first shifting gear 107 due to compression force of the coil spring 106 during a changing operation of the changing mechanism 140 causes the take-up reel table 94 to engage with the limiting gear 99 provided thereon to rotate.

A thermal head gear 120 engages with a small gear 121b of a head idler gear assembly 121 which comprises a gear 121a and the small gear 121b. The gear 121a of the head idler gear assembly 121 engages with a small gear 124b of an intermediate gear assembly 124 including the small gear 124b and a gear 124a engageable with a worm 123 provided on the stepping motor 122 provided as a first driving source. It will be appreciated that the driving force outputted from the stepping motor 122 causes the gear 121a to rotate.

A pin 126 is fixed on the end of the actuating plate 125 and is inserted into one of three recess portions divided by ribs (not shown) provided in the thermal head gear 120. The rotation of the gear 120 therefore causes the rib to come in contact with the pin 126 so as to be pushed laterally, thereby displacing the actuating plate 125.

The actuating plate 125 is operable for swinging the U-shaped arm 60 which pushes the printed paper sheet forwardly within the receiving housing 6. The actuating plate 125 is in the form of a long generally L-shaped plate and has three elongated openings for receiving pins 127, 128, and 129 fixed on the rear plate 3b. As described above, with this arrangement, the actuating plate 125 can move in the longitudinal direction thereof within the range defined by the length of the elongated openings. The L-shaped plate 63 is rotatably supported by the pin 200 fixed on a folded plate 125d provided on the end of an extending portion of the actuating plate 125. Lateral displacement of the actuating plate 125 in the direction of a head driving gear 120 causes the pair of paper pushers 60a of the arm 60 to enter the pair of openings 6d, indicated in FIG. 2, provided in the receiving housing 6. On the other hand, lateral displacement in the opposite direction causes the pair of paper pushers 60a to project upwardly from the pair of openings 6d.

An ejecting stopper 130 is pivotally supported by the pin 127 fixed on the rear plate 3b via the actuating plate 125 and adapted for engaging with a L-shaped hook plate 32b cooperating with a plate 32. The ejecting stopper 130 has an elongated opening 130a for receiving a pin 131 fixed on the actuating plate 125 in its middle portion. Therefore, the lateral displacement of the actuating plate 125 causes the ejecting stopper 130 to rotate about the pin 127 in the direction indicated by a two-dot chain line in FIG. 3. The complete insertion of the feeding tray 20 into the tray holder 5 causes the hook plate 32b to project outwardly from the rear plate 3b. Lateral displacement of the actuating plate 125 causes it to engage with the hook plate 32b preventing the feeding tray from being withdrawn during the feeding of a paper sheets to the printing station.

A cam having a projecting portion 121c and a V-shaped surface 121d is provided on the gear 121a of the head idler gear 121 which has a recess 121e. Coil springs 137 and 138 are connected between the ends of braking arms 132 and 133 and a shaft 135 of the head idler gear 121. The end surfaces of braking arms 132 and 133 are thrust by the springs 137 and 138 toward the peripheral surface of the cam so as to come in contact therewith, while the other end portions take the form of barbs for engaging the limiter gears 98 and 99 respectively. It will be appreciated that the engagement between the barbs and the gears 98 and 99 due to the rotation of the cam causes the supply reel table 93 and the take-up reel table 94 to be stopped.

The driving force changing system will be described hereinbelow.

The driving force changing mechanism 140 comprises a cam gear assembly 143 and a shifting lever 145. The cam gear assembly 143 includes a small gear 141 for engaging the head idler gear 121 and a cam 142 having a cam surface 142a which is in the form of a recess. The shifting lever 145 functions as a cam follower and is pivotally mounted on a U-shaped mounting plate 144 via a shaft 145. One end of the lever 145 comes in contact with the cam surface 142a of the cam gear assembly 143. A leaf spring 146 for engaging the upper surface of the shifting gear 107 is connected to the other end thereof. The rotation of the cam gear assembly 143 causes the shifting lever 145 to rotate about the shaft 145 according to the configuration of the cam surface 142a and thereby the leaf spring 146 shifts the shifting gear 107 between its three positions (outside, middle, and innerside).

A pair of pins 141a is fixed on the end surface of the small gear 141 of the cam gear assembly 143. A base plate portion 149a of an L-shaped locking arm 149 is adapted for engaging the pair of pins 141a. The locking arm has a hollow cylindrical portion at its corner into which a shaft is inserted and pivotally supported by a U-shaped mounting plate 147, indicated in FIG. 15, via a coil spring 148. It will be noted that the rotation of the cam gear assembly causes the pin 141 to come in contact with the base plate portion 149a and thereby the locking arm 149 rotates to release a barbed portion 149b from an engaging portion 98a of the limiter gear 98 against the repulsing force of the spring 148. The supply reel table 93 can therefore rotate.

Figure 3:
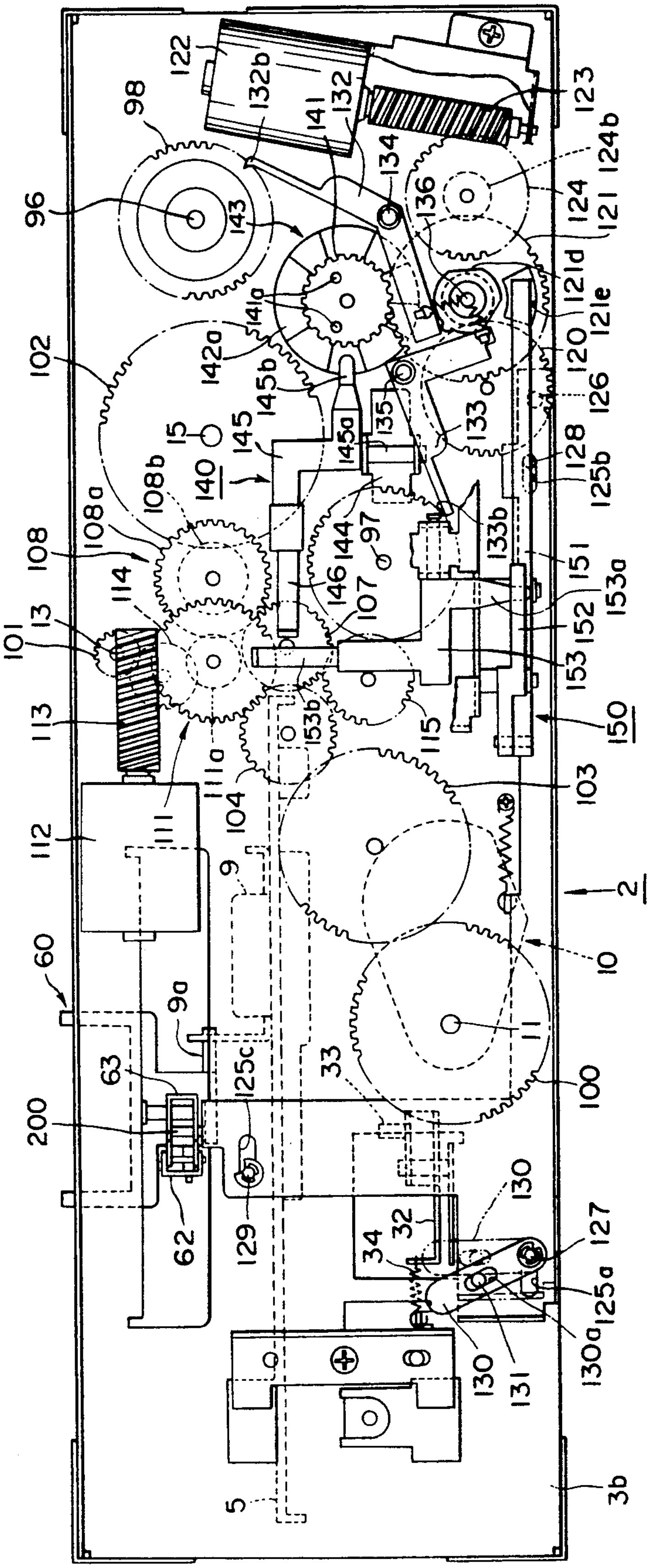
FIG. 3 is a rear view of a color printing apparatus of the invention.
Figure 4:
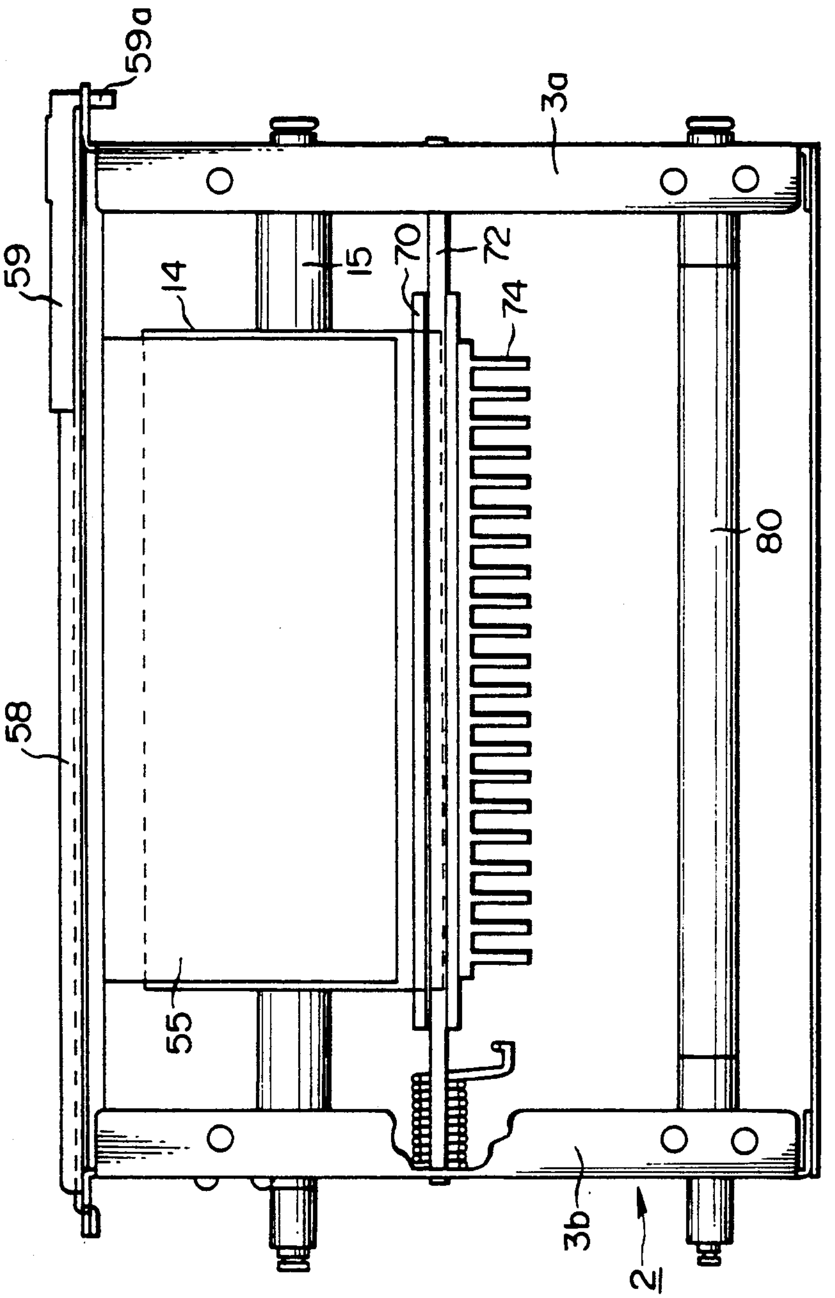
FIG. 4 is a partially cutaway side view of a color printing apparatus of the invention.

The second driving force changing mechanism 150 comprises an operating lever 151, an intermediate operating lever 152, and a shifting lever 153. The operating lever 151 is provided with a barbed portion 151a, at one end, for engaging with, and being released from, the recess 121e of the head idler gear 121, a curved portion 151 at its middle portion, and a pin 151c secured on the other end. The intermediate lever 152 has a pin 152b projecting vertically from its middle portion and an elongated opening 152a. One end of the pin 152b is inserted into a hole formed in the operating lever 151, while the other end thereof is rotatably mounted in the mounting plate 95, as shown in FIG. 3. The shifting lever 153 includes a supporting shaft 153c, an engaging shaft 153a, and a leaf spring 153b. The lever 153 is pivotally supported by the shaft 153c on a bracket portion 95a of the mounting plate 95. The engaging shaft 153a is inserted into the elongated opening 152a of the intermediate operating lever 152. The leaf spring 153b is in contact with the surface of the shifting gear 111. It will be appreciated that swinging the operating lever 151 causes the shifting gear 111 to be shifted to an inside or outside position by the leaf spring 153b.

The printing operation of the printer according to the present invention will be described hereinbelow.

Figure 18:
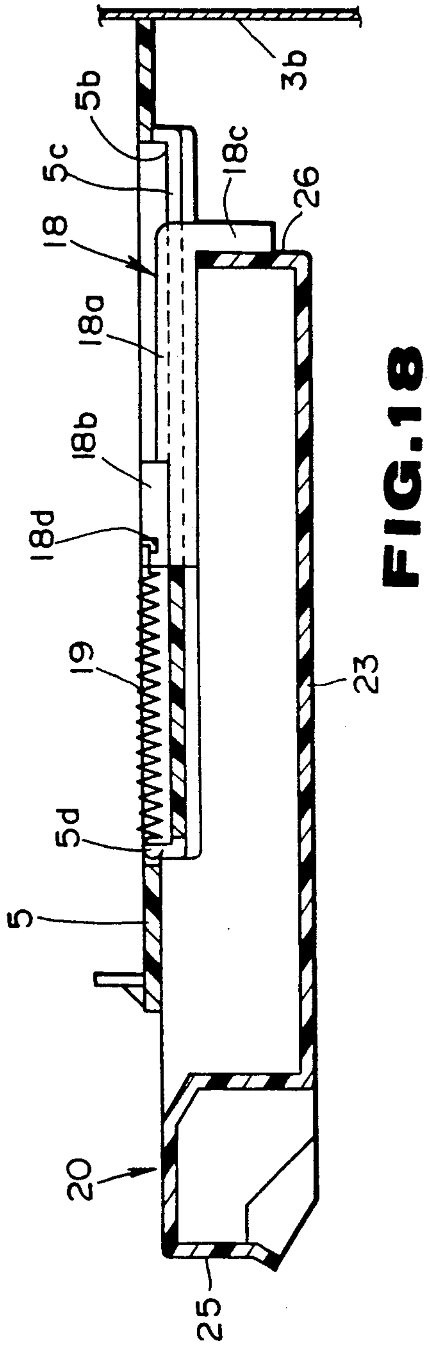
FIG. 18 is a sectional side view showing a paper feeding tray which is in its loading state.
Figure 19:
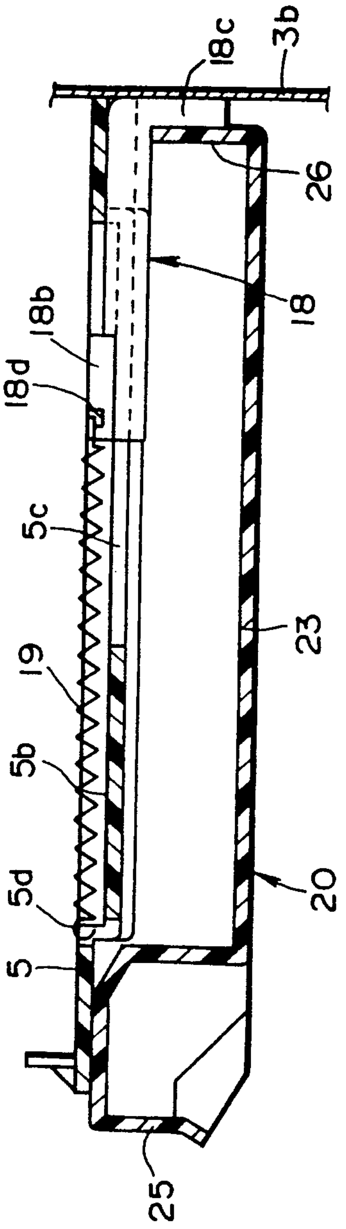
FIG. 19 is a sectional side view showing a paper feeding tray which is in the loading end position.
Figure 27:
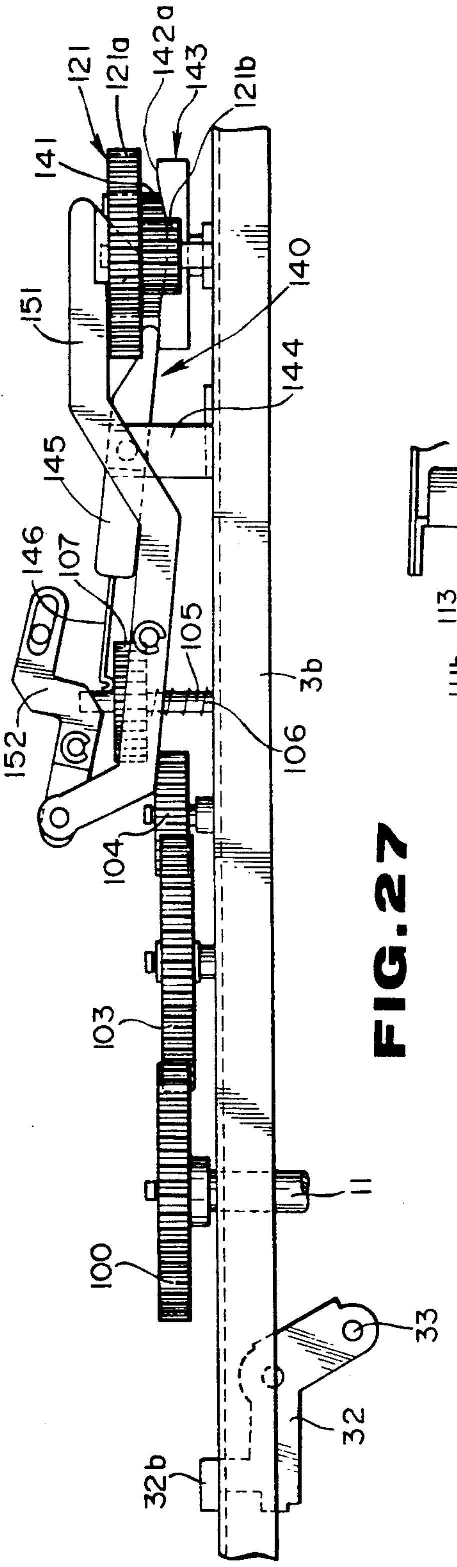
FIG. 27 is a bottom view of a driving mechanism for a printer in an initial state.
Figure 28:
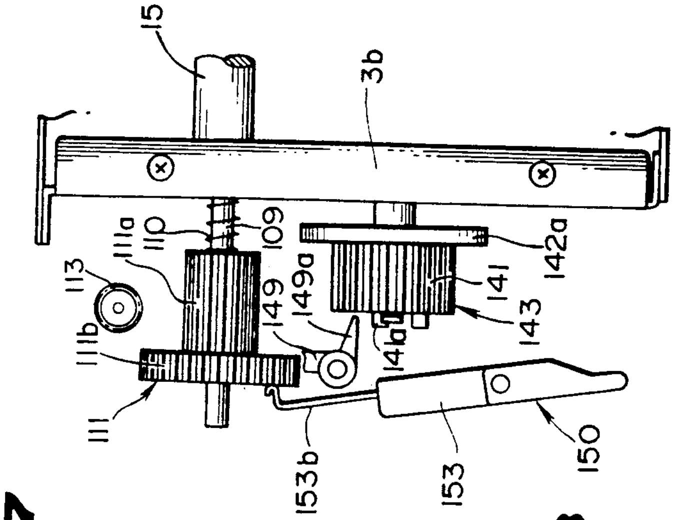
FIG. 28 is a side view of a driving mechanism for a printer when it is in an initial state.
Figure 29:
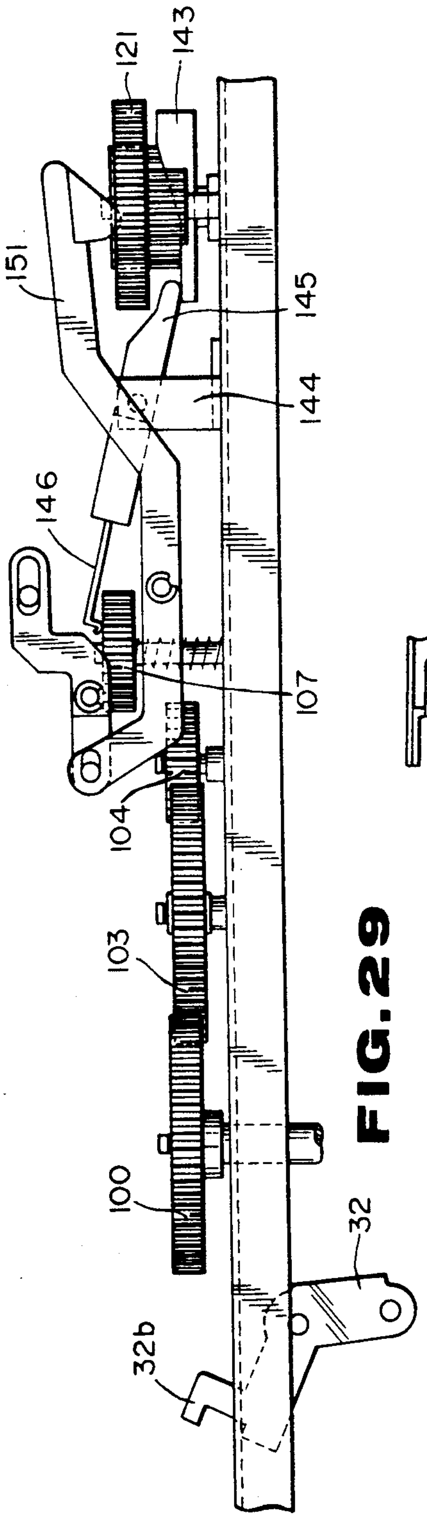
FIG. 29 is a bottom view of a driving mechanism for a printer while the leader section of a ribbon is being aligned.
Figure 30:
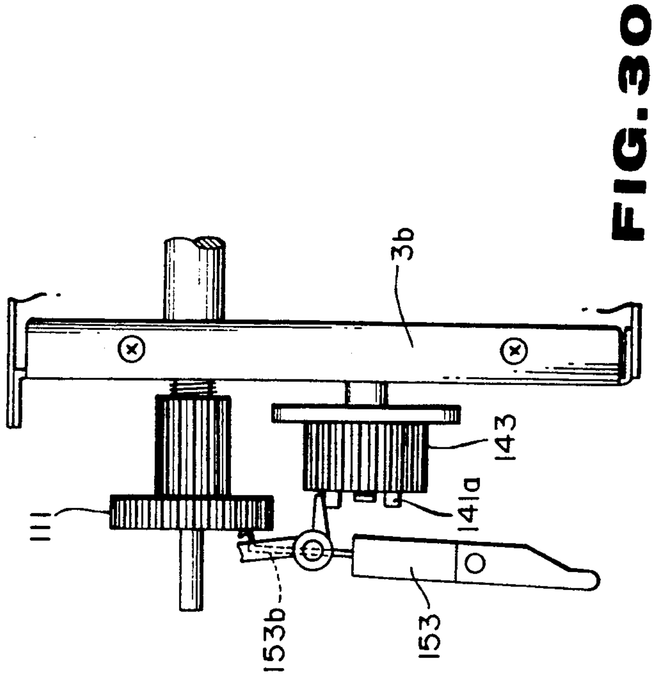
FIG. 30 is a side view of a driving mechanism of a printer while the leader section of a ribbon is being aligned.

In an initial state before printing, (or when the feeding tray 20 is loaded or unloaded, the ribbon cartridge 85 is installed or removed, or a paper sheet 8 is jammed) the feeding roller 30 of the feeding mechanism 10 is spaced downwardly from the bottom of the feeding tray 20. The U-shaped arm 60 for pushing out the ejected paper sheet projects upwardly from the upper step 6a of the receiving housing 6 and is inclined forwardly. In this state, as shown in FIGS. 27 and 28, the first shifting gear 107 is located in the middle position on the shaft 105 as described above, while the second shifting gear 111 is released from the worm 113 of the stepping motor 112. Thereafter, as shown in FIGS. 18 and 19, when the feeding tray 20 is loaded into the tray holder 5, the feeding tray 20 is locked, as shown in FIGS. 20 (*c*), by the locking mechanism 30. At this time, the hook plate 32b projects outwardly from the rear plate 3b, as shown in FIG. 29. A print start button (not shown) is pressed to operate the stepping motor 122, thereby causing the head driving gear 120 to rotate. As shown in FIGS. 16, 29, and 30, the rotation of the head driving gear 120 causes the driving force changing mechanism to shift the first shifting gear 107 to the outside position, allowing the first shift gear 107 to engage with the limiter gear 99 of the take-up reel table via the intermediate gear 115. The driving operation of the take-up driving reel table 94 causes the leader of the ribbon 86 to be aligned at an initial position, while the second shifting gear 111 engages with the worm 113 of the stepping motor 112 due to the changing operation of the driving force changing mechanism 150, so that the platen 14 and the ejecting roller 12 rotate (the second shifting gear 111 maintains engagement with the worm until the ejecting operation of the printed paper sheet begins). When the ribbon is aligned at its initial position, a braking arm 132, a locking arm 149 of the supply reel table 93, and the braking arm 133 of the take-up reel table 94 are released so as to allow the ribbon to move freely. The driving of the head driving gear 120 causes the actuating plate 125 to be displaced laterally with the result that the eject stopper 130 engages with the hook portion 32b of the locking mechanism, thereby preventing the feeding tray 20 from being withdrawn from the tray holder 5. It will be appreciated that the removal of the feeding tray 20 is prevented during feeding of the paper sheets and during printing. Moreover, the lateral displacement of the actuating plate 125 causes the pair of paper pushers 60*a* of the arm 60 to swing rearwardly within the opening 6*d* provided in the higher step of the receiving housing 6, maintaining this state until the ejecting operations begins.

Figure 22:
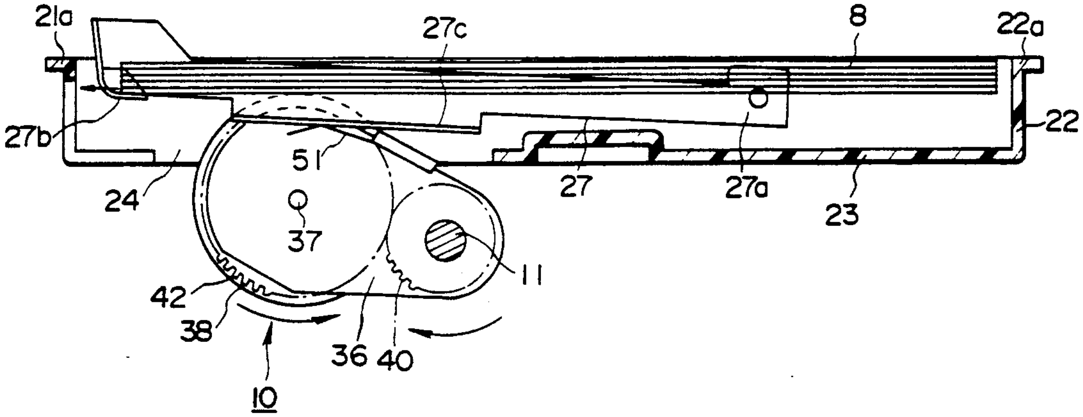
Figure 23:
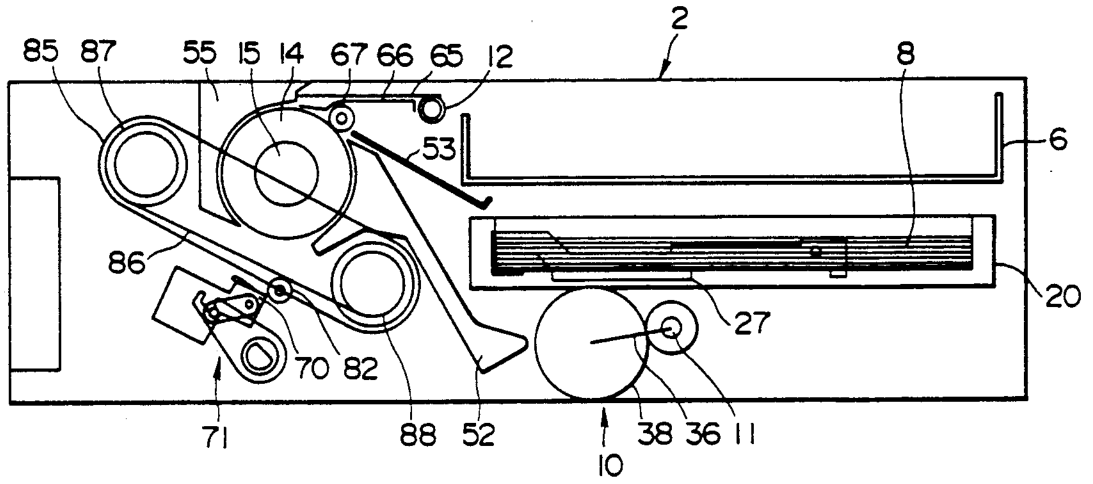
FIG. 23 is an explanatory cutaway side of the printer in a pre-printing mode.
Figure 24:
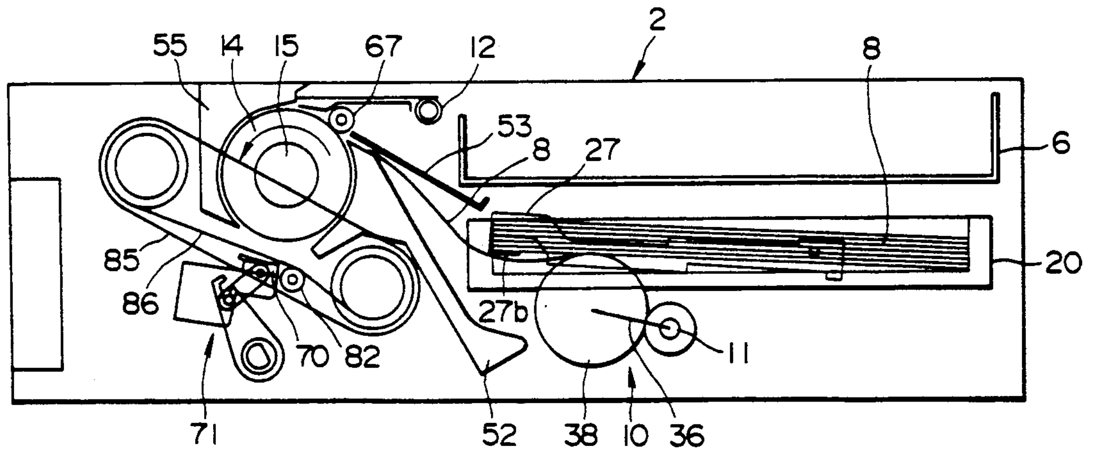
FIG. 24 is an explanatory view which shows a paper sheet fed to a platen.
Figure 31:
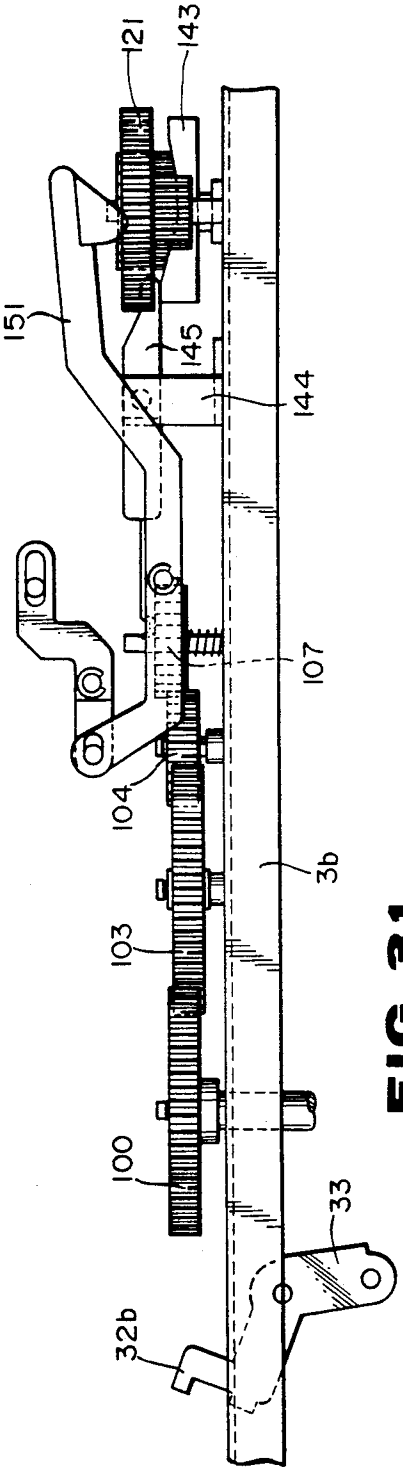
FIG. 31 is a bottom view of a driving mechanism for a printer when a paper sheet is fed to a printing station.
Figure 32:
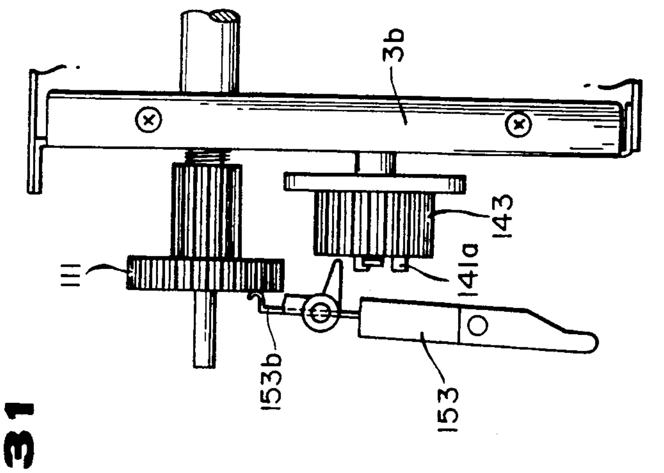
FIG. 32 is a side view of a driving mechanism of the printer when a paper sheet is being fed to a printing station.

The rotation of the stepping motor 122 causes the first shift gear 107, as shown in FIG. 31, to be shifted to the innerside position, engaging with driving gear 100 for the feeding roller through the intermediate gears 103 and 104. As shown in FIGS. 22 and 24, the rotation of the driving gear 100 causes the the feeding roller 38 to be lifted up so as to come in contact with the back surface of the lowermost paper sheet 8 in the stack of paper sheets within the feeding tray 20. The rotation of the paper feeding roller 38 causes a paper sheet 8 to be fed to the printing station 7. During this feeding, the braking arm 132 and the locking arm 149 engage with the engaging portion 98*a* and the limiter gear 98 respectively, while the braking arm 133 engages with the limiter gear 99.

Figure 33:
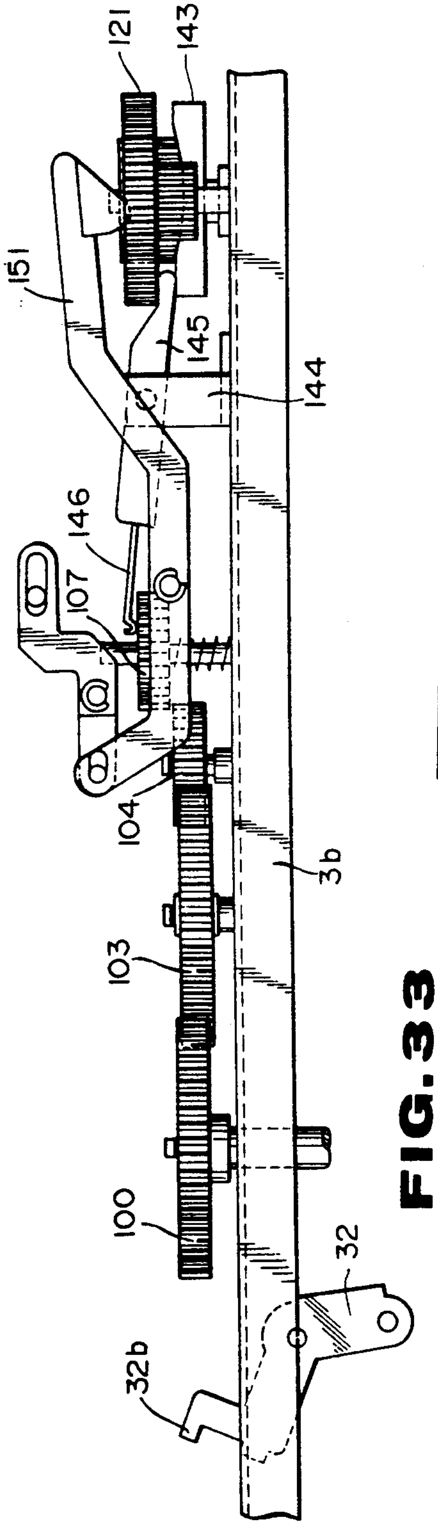
FIG. 33 is a bottom view of a driving mechanism for a printer when a paper sheet is wrapped about a platen and is transferred to an ejecting housing.
Figure 34:
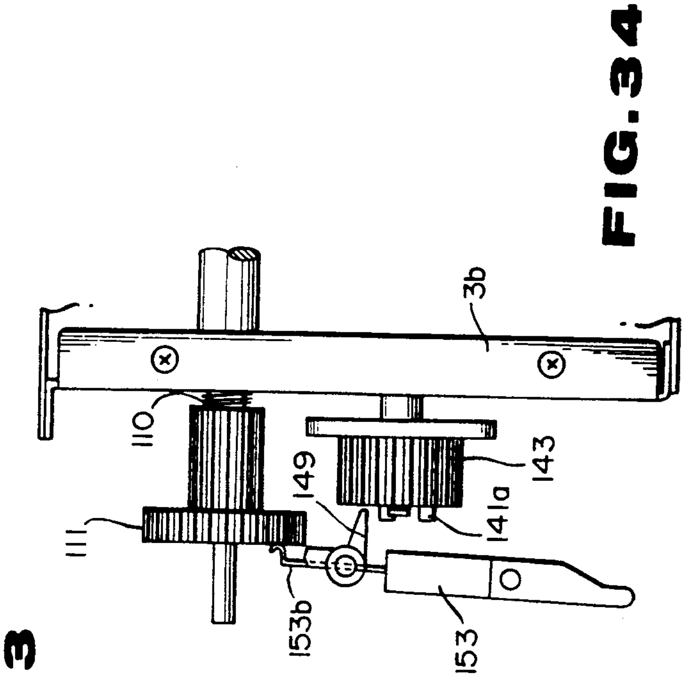
FIG. 34 is a side view of a driving mechanism for a printer which is in the same state as FIG. 33.

The paper sheet 8 fed from the feeding tray 20 then is wrapped so that its back surface contacts the periphery of the platen 14 and rotates therewith in the direction indicated arrow in FIG. 24. During feeding this paper sheet 8, the first shifting gear is located at its middle position as shown in FIG. 33.

Figure 25:
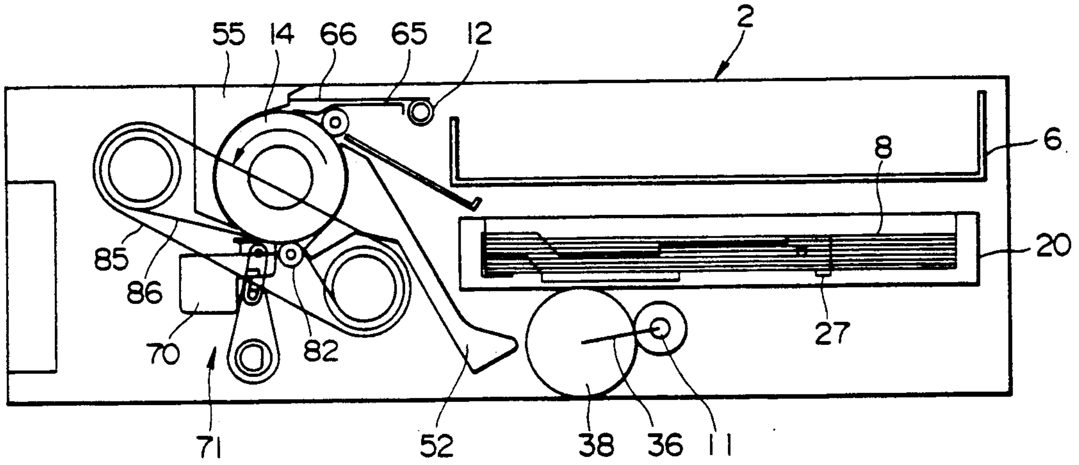
FIG. 25 is an explanatory view showing a paper sheet being printed.
Figure 35:
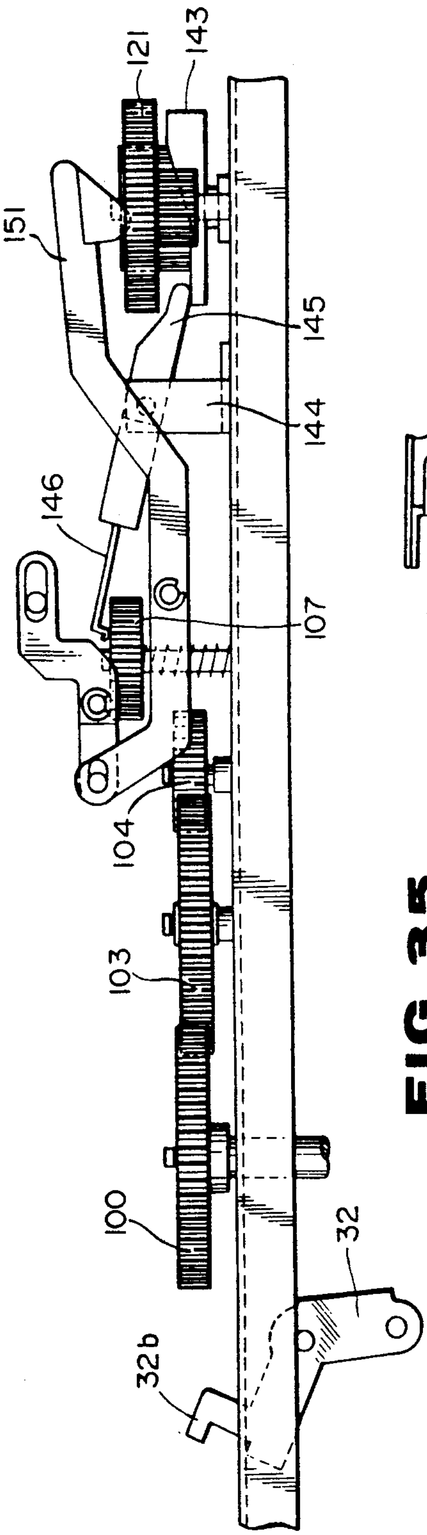
FIG. 35 is a bottom view which shows a driving mechanism for a printer while a paper sheet is being printed.
Figure 36:
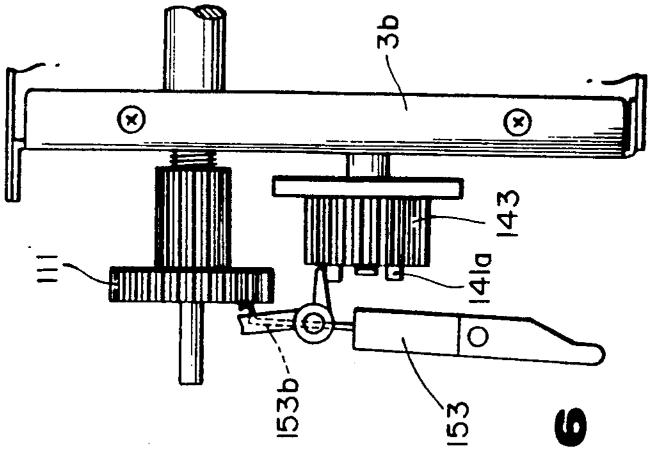
FIG. 36 is a side view which shows a driving mechanism which is in the same state as FIG. 35.
Figure 37:
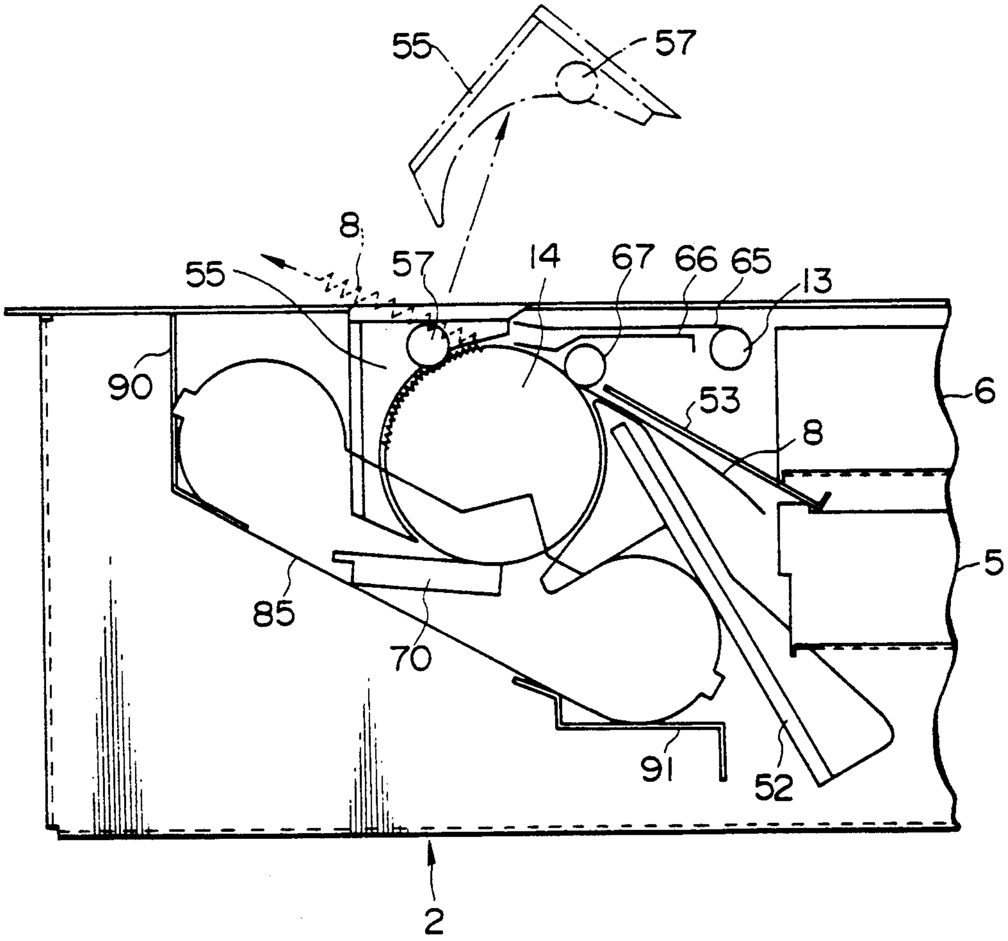
FIG. 37 is a view in which a paper sheet is jammed.
Figure 38:
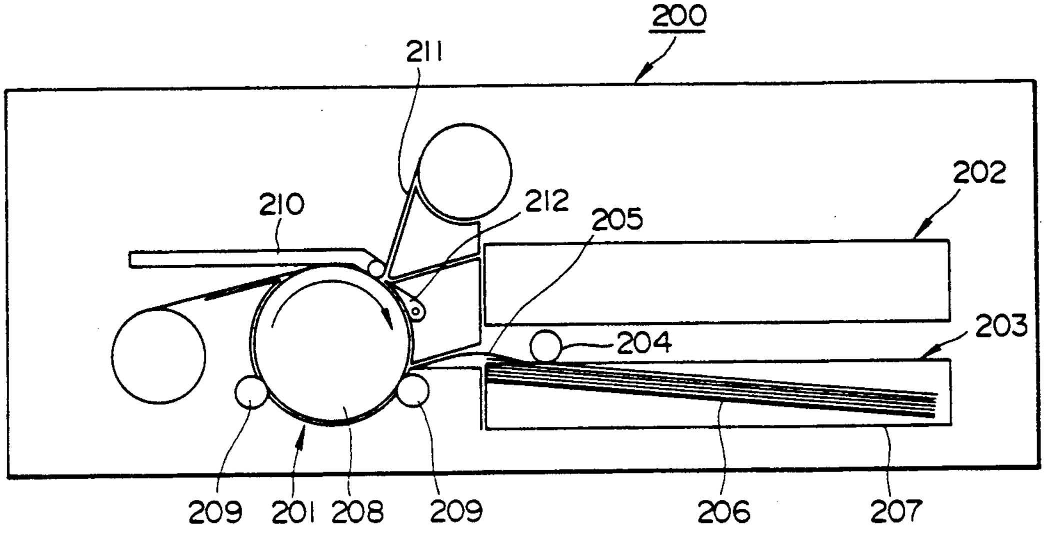
FIG. 38 (PRIOR ART)
FIG. 38 is a schematically explanatory view which shows a conventional printer in a paper feeding state.
Figure 39:
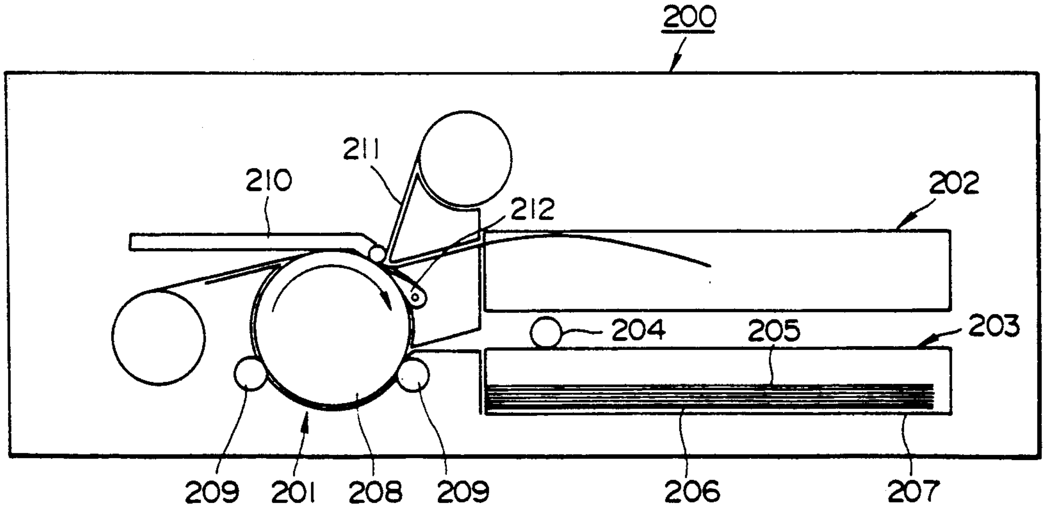
FIG. 39 (PRIOR ART)
FIG. 39 is a schematically explanatory view which shows a paper ejecting state in a conventional printer.

The rotation of the head driving gear 120 by means of the stepping motor 122 causes, as shown in FIG. 25, the head moving mechanism 71 to lift the thermal head 70 up toward the platen 14, pushing the ribbon 86 against the platen. At this time, as shown in FIG. 35, the first shifting gear 107 is positioned at its outside position similar to alignment of the leader of the ribbon 86 and drives the driving take-up reel table 94. The braking arm 133 and the locking arm 149 are released from the limiter gear 99 and the engaging portion 98 of the limiter gear 98 respectively, while the braking arm 132 engages the limiter gear. During printing, the brakes of the supply reel table 93 are applied, preventing it from running idle with the result that a back tension is applied to the ribbon. Thereafter, printing begins.

Figure 40:
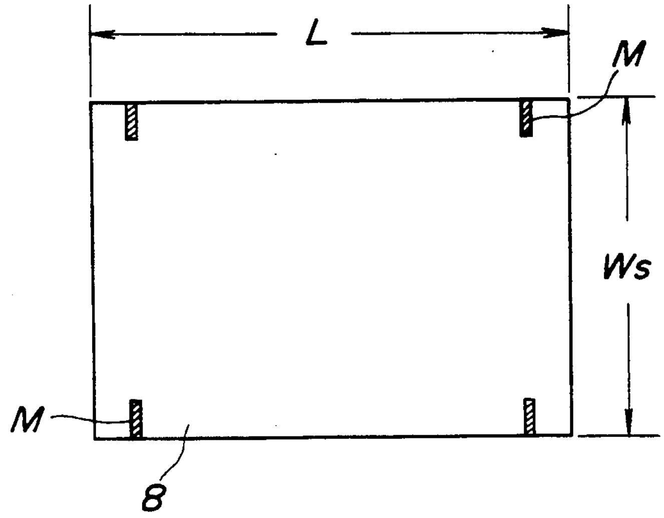
FIG. 40 is an explanatory view which shows a sheet of printing paper.
Figure 41:
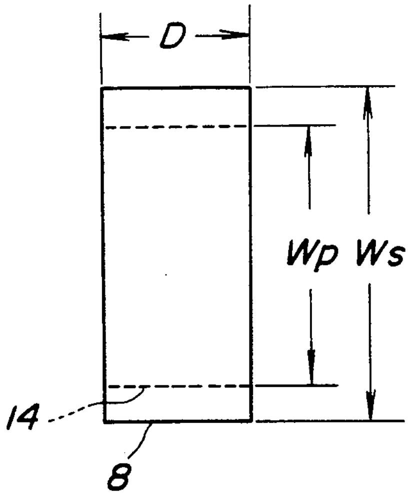
FIG. 41 is a view which shows the relationship between the printing paper sheet in FIG. 40 and a platen according to the invention.

As shown in FIGS. 40 and 41, the width ($W_p$=89 mm) of the platen 14 is less than the width ($W_s$=100 mm) of the paper sheet 8 by a predetermined value (11 mm) so that the sensor 300 can easily detect marks (M) printed on the edge of reverse surface of the paper sheet 8. The circumference $\pi D$ (D=diameter of the platen) of the platen 14 is less than the length (L) of the paper sheet 8 by a predetermined value. It will thus be appreciated that the end of the paper sheet 8 when wrapped on the platen 14 overlaps by the predetermined length.

In conventional printers, when a platen with sheet of paper wrapped thereon rotates, the leading edge of the sheet tends to collide with the pinch roller or the guide roller and this results in the position of the sheet shifting about the periphery of the platen. Therefore, the print starting positions of the respective colors Y, M, and C therefore tend to be shifted causing the printed image to be unclear.

By overlapping the both ends of the paper sheet as in the present invention however, the paper sheet is prevented from colliding with the pinch roller 57 or so forth and therefore the initial printing positions of the three colors do not become shifted.

When the paper sheet 8, as shown in FIG. 41, is fed to the platen 14 and the mark M passes under the sensor 300, the sensor detects it and provides a signal to a printing controller (not shown). The sensor 300 is, as shown in FIG. 1, located at a position adjacent to the end surface of the platen 14 and near the contact surface of the platen with the thermal head 70 so as to sense the mark M printed on the edge of the sheet which protrudes beyond from the platen. Thereafter, according to a signal outputted from the printing controller, the thermal head 70 generates heat to begin printing yellow from the mark or a predetermined position on the paper sheet 8 according to a signal outputted from the printing controller.

After the platen 14 rotates one cycle, the paper sheet 8 overlaps. The mark M printed on the paper sheet 8 passes under the sensor 300 again to be detected thereby. The C color is then printed on the paper sheet 8 in the same manner as the previous printing. After the C color is printed, the M color is printed on the paper sheet 8.

Figure 26:
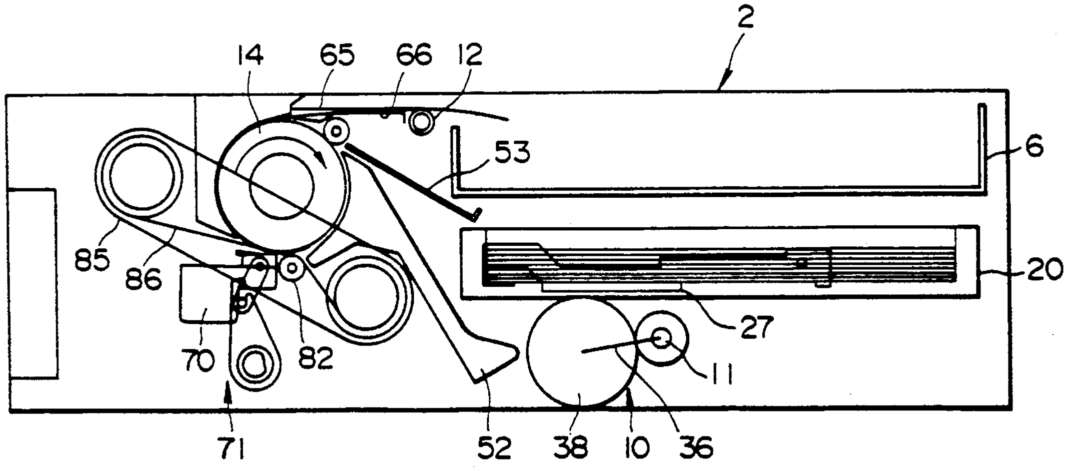
FIG. 26 is an explanatory view showing a printed paper sheet which is ejected to a receiving housing.

When the printing is finished, as shown in FIG. 26, the rotation of the platen 14 reverses and the platen rotates in the clockwise direction. The printed paper sheet 8 is carried toward the receiving tray housing 6 by the ejecting roller 13 and is guided onto the step 6*a* by the rear wall 6*c* and the guiding plate 6*e*. During ejecting of the paper sheet 8, as shown in FIG. 33, the first shifting gear 107 is positioned at its middle position. Only the platen 14 and the ejecting roller are operable to rotate by means of the stepping motor 112. Thereafter, the actuating plate 125 turns back to the initial position to swing the pair of paper pushers 60*a* in the forward direction. The printed paper sheet on step 6*a* is ejected onto the receiving tray 64.

As described above, in the printer according to the present invention, the paper feeding roller 38 contacts the lowermost paper sheet exposed by the opening 24 of the feeding tray 20 to feed it to the platen 14. The paper sheet wraps on the peripheral surface of the platen with its reverse surface in contact therewith. Therefore, the sheets of paper are stored within the feeding tray with the printing surfaces up and this prevents the printing surfaces from being damaged.

When the platen rotates one cycle, the ends of the paper overlap. Thereafter, printing is performed as the platen is rotated and since the ends of the sheet overlap, shifting of the paper on the platen due to collisions of the edges of the sheet of paper with obstacles is avoided.

While the present invention has been described with respect to specific embodiments thereof, it is evident that many alternatives, modifications, and variations will be apparent to those skilled in the art.

We claim:

1. A printing apparatus for printing an image on a printing surface of a sheet of printing medium having opposed ends and a length comprising:

a rotatable platen whose circumference is less than the length of said sheet by a predetermined value;

first means for driving said platen about which said sheet is wrapped so that the ends of said sheet overlap each other during rotation; and second means for printing an image on said sheet of printing medium during rotation of said platen.

2. An apparatus as set forth in claim 1, wherein said sheet of printing medium has a width and said platen has a width less than the width of said sheet of printing medium.

3. An apparatus as set forth in claim 2, further comprising third means, for determining a printing start position for each revolution of the platen, provided in a vicinity of said second means.

4. An apparatus as set forth in claim 3, wherein said sheet has a mark printed on a side edge of a reverse surface opposite said printing surface of said sheet, which side edge projects beyond an end of said platen when said sheet is wrapped thereabout, and said third means determining the printing start position by sensing said mark during each revolution of said platen during printing.

5. A printing apparatus for printing an image on a sheet of printing medium having a printing surface comprising:

a printing head printing the image on the printing surface of said sheet;

a platen rotatable in a predetermined direction, provided at a printing station, about which said sheet is wound during a printing operation;

a tray having a bottom, for storing a stack of printing medium sheets, and having an opening in the bottom of said tray so as to expose a reverse surface opposite the printing surface of a lowermost sheet of the stack of the printing medium sheets; and feeding means, provided under said tray, for feeding said lowermost printing medium sheet exposed in said opening toward said platen wherein said feeding means includes a rotatable roller which feeds said lowermost sheet so that the reverse surface contacts a surface of the platen and the image is printed on the printing surface thereof by said printing head.

6. A printing apparatus for printing an image on a sheet of printing medium having a length, a printing surface, and a reverse surface opposite said printing surface comprising:

a platen rotatable in a predetermined direction, provided at a printing station, about which said sheet is wound during a printing operation;

a tray having a bottom, for storing a stack of printing medium sheets, and having an opening in the bottom of the tray so as to expose the reverse surface of a lowermost sheet of the stack of the printing medium sheets; and feeding means, provided under said tray, for feeding said lowermost printing medium sheet exposed in said opening toward said platen, wherein the platen has a circumference smaller than the length of said sheet by a predetermined value.

7. An apparatus as set forth in claim 1, wherein the sheet has a width and the platen has a width smaller than the width of said sheet by a predetermined value.

8. A printing apparatus for printing an image on a sheet of printing medium having a printing surface comprising:

a platen rotatable in a predetermined direction, provided at a printing station, about which said sheet is wound during a printing operation;

a tray having a bottom, for storing a stack of printing medium sheets, and having an opening in the bottom of the tray so as to expose a reverse surface opposite said printing surf of a lowermost sheet of the stack of the printing medium sheets; and feeding means, provided under said tray, for feeding said lowermost printing medium sheet exposed in said opening toward said platen, wherein said sheet has a width and said platen has a width which is smaller than the width of said sheet by a predetermined length.

9. A multicolor printing apparatus for printing an image on a sheet of printing medium having opposed ends comprising:

a tray with a bottom, for storing a stack of printing medium sheets each with a printing surface, and having an opening in the bottom of the tray from which a reverse surface opposite said printing surface of a lowermost sheet stored therein is exposed;

a rotatable platen, provided at a printing station, whereon said sheet is wound so that the ends of said sheet overlap each other and a side edge thereof projects beyond an end of the platen during printing;

first means, for feeding said outermost sheet exposed in said opening toward said platen, provided under said tray;

second means for driving said platen by a predetermined number of rotations in each printing operation;

third means for printing an image on said sheet wrapped about said platen during rotation of said platen; and fourth means, associated with said third means, for sensing said printing sheet wrapped about said platen to determine a printing start position for each revolution of said platen, provided in the vicinity of said third means.

10. An apparatus as set forth in claim 9, wherein said printing medium sheet has a mark on a side edge of said reverse surface, and said fourth means sensing said mark to determine said print starting position.

11. A printing apparatus for printing an image on a sheet of printing medium having opposed ends comprising:

first means provided at a printing station, on which said sheet is wound such that the ends of said sheet overlap;

means for rotating said first means a predetermined number of revolutions in one printing operation; and second means for printing an image on said sheet of printing medium during said predetermined revolutions of said first means.

12. An apparatus as set forth in claim 11, further comprising a feeding roller adapted for coming in contact with a reverse surface of said sheet to feed it to said first means.

* * * * *